United States Patent
Parmar et al.

(10) Patent No.: US 12,346,332 B2
(45) Date of Patent: Jul. 1, 2025

(54) CHAINING OF DOMAIN SPECIFIC LANGUAGE-BASED QUERIES

(71) Applicant: Tenable, Inc., Columbia, MD (US)

(72) Inventors: Vipul Parmar, San Jose, CA (US); Omprakash Moolchandani, Bolingbrook, IL (US)

(73) Assignee: TENABLE, INC., Columbia, MD (US)

( * ) Notice: Subject to any disclaimer, the term of this patent is extended or adjusted under 35 U.S.C. 154(b) by 0 days.

(21) Appl. No.: 18/446,666

(22) Filed: Aug. 9, 2023

(65) Prior Publication Data
US 2025/0053565 A1 Feb. 13, 2025

(51) Int. Cl.
G06F 16/2455 (2019.01)
G06F 16/242 (2019.01)
G06F 16/2453 (2019.01)
G06F 16/2458 (2019.01)
H04L 9/40 (2022.01)

(52) U.S. Cl.
CPC .... *G06F 16/24561* (2019.01); *G06F 16/2448* (2019.01); *G06F 16/24539* (2019.01); *G06F 16/2471* (2019.01); *H04L 63/1433* (2013.01)

(58) Field of Classification Search
None
See application file for complete search history.

(56) References Cited

U.S. PATENT DOCUMENTS

| | | | |
|---|---|---|---|
| 6,651,142 B1* | 11/2003 | Gorelik | G06F 16/9574 711/119 |
| 2018/0367557 A1* | 12/2018 | Brown | G06F 16/90335 |
| 2020/0159731 A1* | 5/2020 | Gino | G06F 16/2471 |
| 2023/0412635 A1* | 12/2023 | Binyamini | G06N 5/022 |

* cited by examiner

*Primary Examiner* — Kannan Shanmugasundaram
(74) *Attorney, Agent, or Firm* — Muncy, Geissler, Olds & Lowe, P.C.; Daniel Podhajny

(57) ABSTRACT

In an aspect, a component generates a domain-specific language (DSL) query comprising an ordered set of data source-specific queries that comprises a set of chained data source-specific queries. The set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query. The component executes the DSL query to derive a set of results comprising: a DSL query result associated with the set of chained data source-specific queries, and a set of intermediate results associated with the set of chained data source-specific queries. The component reports information associated with the set of results.

33 Claims, 19 Drawing Sheets

FROM FIG. 13A ←

DSL - STEP

```
{
  "NAME": "FETCH_VULNERABILITY_AWS_INSTANCE",
  "DESCRIPTION": "VULNERABLE AWS INSTANCE",
  "PAGINATION": TRUE,
  "PROVIDER_QUERY":{
    "QUERY": {
      "BOOL": {
        "MUST": [
          {
            "MATCH": {
              "TYPE": "AWS_INSTANCE"
            }
          },
          {
            "WILDCARD": {
              "VULNERABILITY.NAME.KEYWORD": {
                "VALUE": "*"
              }
            }
          },
          {
            "BOOL": "THIS.CONDITION1"
          }
        ]
      }
    },
    "FIELDS": [
      "UPDATED_AT",
      "VULNERABILITY.NAME",
      "CONFIG.ID"
    ],
    "_SOURCE": FALSE
  },
  "OUTPUT": [
    "CONFIG.ID::INSTANCE_ID"
  ],
  "CONDITION": [
    {
      "NAME": "CONDITION1",
      "SOURCE_FIELD": "FETCH_LB_TARGET_INSTANCE.INSTANCE_ID",
      "TARGET_FIELD":"CONFIG.1",
      "OPERATOR_TYPE": "OR"
    }
  ]
}
```

STEP - RESULT

```
0
{
  "GLOBAL_ID": "20614F68-35D9-4905-
  "FIELDS": {
    "CONFIG.TARGET_ID": [
      "I-0DC55C29B3F2D84CA"
    ]
  }
}
```

→ VULNERABLE EC2 INSTANCE ARE THE FINAL RESULT OF THE DSL.

THIS STEP FILTERS VULNERABLES AWS EC2 INSTANCES FROM PREVIOUS STEP;

*FIG. 13B*

CHAINING OF DOMAIN SPECIFIC LANGUAGE-BASED QUERIES

BACKGROUND OF THE DISCLOSURE

1. Field of the Disclosure

Aspects relate to security functions based on chaining of domain specific language (DSL)-based queries.

2. Description of the Related Art

When attempting to discover asset relationships, security risks, exposure semantics, attack paths and to perform general security analytics, an analyst or automated system must execute multiple queries in a specific order against generic Large Data Sets from a variety of sources. In some designs, the result set from such queries could result in expected data items, but the order of queries executed must be based on the well-known relationships between different entities and resource types. Based on the relationship, the analytics queries may need to provide the output of a query as input to the subsequent queries. Implementing such queries manually in any search platform is tedious, error-prone, unpredictable and resource intensive.

Another problem that arises with the above querying technique is that an analyst or automated system requires rewriting or duplicating parts of the old query for every new search or discovery query for new use cases. That means analysts are not able to reuse the knowledge of previous queries to construct newer queries due to lack of technology that can allow usage of previously constructed queries as primitives.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating a component includes generating a domain-specific language (DSL) query comprising an ordered set of data source-specific queries that comprises a set of chained data source-specific queries, wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query; executing the DSL query to derive a set of results comprising a DSL query result associated with the set of chained data source-specific queries, and a set of intermediate results associated with the set of chained data source-specific queries; and reporting information associated with the set of results.

In some aspects, the DSL query is a DSL JavaScript Object Notation (JSON) query.

In some aspects, the first field of the second data source-specific query inputs the first intermediate result of the first data source-specific query as a primitive.

In some aspects, the first data source-specific query is associated with a first data source and the second data source-specific query is associated with a second data source that is different than the first data source.

In some aspects, the first data source is a public cloud and the second data source is a region, or the first data source is the region and the second data source is a virtual private cloud, or wherein the first data source is the virtual private cloud and the second data source is a private subnet, or wherein the first data source is the private subnet and the second data source is a target group of instances.

In some aspects, the set of chained data source-specific queries is chained from a public cloud to a target group of instances inside of a private subset associated with the public cloud.

In some aspects, the set of chained data source-specific queries comprises a third data source-specific query that is configured to be executed after the second data source-specific query, with the third source-specific query being chained to the second data source-specific query via a second field of the third data source-specific query that is linked to a second intermediate result of the second data source-specific query.

In some aspects, the set of chained data source-specific queries comprises a third data source-specific query that is configured to be executed before the second data source-specific query, with the second data source-specific query being chained to the third source-specific query via a second field of the second data source-specific query that is linked to a second intermediate result of the third data source-specific query.

In some aspects, the first intermediate result is paginated.

In some aspects, the DSL query result corresponds to a result of a final data source-specific query of the set of chained data source-specific queries, and the set of intermediate results comprises each intermediate result associated with each of the set of chained data source-specific queries except for the final data source-specific query of the set of chained data source-specific queries.

In some aspects, the first intermediate result of the first data source-specific query is a pre-fetched query result.

In some aspects, the reporting reports the DSL query result, or the reporting reports one or more intermediate results from the set of intermediate results, or a combination thereof.

In some aspects, the method includes transforming the set of results into a graph data set, wherein the reporting reports the graph data set.

In some aspects, the method includes scanning the set of results to detect an attack chain stage associated with an intrusion.

In an aspect, a component includes one or more memories; and one or more processors communicatively coupled to the one or more memories, the one or more processors, either alone or in combination, configured to: generate a domain-specific language (DSL) query comprising an ordered set of data source-specific queries that comprises a set of chained data source-specific queries, wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query; execute the DSL query to derive a set of results comprising a DSL query result associated with the set of chained data source-specific queries, and a set of intermediate results associated with the set of chained data source-specific queries; and report information associated with the set of results.

In some aspects, the DSL query is a DSL JavaScript Object Notation (JSON) query.

In some aspects, the first field of the second data source-specific query inputs the first intermediate result of the first data source-specific query as a primitive.

In some aspects, the first data source-specific query is associated with a first data source and the second data source-specific query is associated with a second data source that is different than the first data source.

In some aspects, the first data source is a public cloud and the second data source is a region, or the first data source is the region and the second data source is a virtual private cloud, or wherein the first data source is the virtual private cloud and the second data source is a private subnet, or wherein the first data source is the private subnet and the second data source is a target group of instances.

In some aspects, the set of chained data source-specific queries is chained from a public cloud to a target group of instances inside of a private subset associated with the public cloud.

In some aspects, the set of chained data source-specific queries comprises a third data source-specific query that is configured to be executed after the second data source-specific query, with the third source-specific query being chained to the second data source-specific query via a second field of the third data source-specific query that is linked to a second intermediate result of the second data source-specific query.

In some aspects, the set of chained data source-specific queries comprises a third data source-specific query that is configured to be executed before the second data source-specific query, with the second data source-specific query being chained to the third source-specific query via a second field of the second data source-specific query that is linked to a second intermediate result of the third data source-specific query.

In some aspects, the first intermediate result is paginated.

In some aspects, the DSL query result corresponds to a result of a final data source-specific query of the set of chained data source-specific queries, and the set of intermediate results comprises each intermediate result associated with each of the set of chained data source-specific queries except for the final data source-specific query of the set of chained data source-specific queries.

In some aspects, the first intermediate result of the first data source-specific query is a pre-fetched query result.

In some aspects, the reporting reports the DSL query result, or the reporting reports one or more intermediate results from the set of intermediate results, or a combination thereof.

In some aspects, the one or more processors, either alone or in combination, are further configured to: transform the set of results into a graph data set, wherein the reporting reports the graph data set.

In some aspects, the one or more processors, either alone or in combination, are further configured to: scan the set of results to detect an attack chain stage associated with an intrusion.

In an aspect, a non-transitory computer-readable medium storing computer-executable instructions that, when executed by a component, cause the component to: generate a domain-specific language (DSL) query comprising an ordered set of data source-specific queries that comprises a set of chained data source-specific queries, wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query; execute the DSL query to derive a set of results comprising a DSL query result associated with the set of chained data source-specific queries, and a set of intermediate results associated with the set of chained data source-specific queries; and report information associated with the set of results.

In some aspects, the DSL query is a DSL JavaScript Object Notation (JSON) query.

In some aspects, the first field of the second data source-specific query inputs the first intermediate result of the first data source-specific query as a primitive.

In some aspects, the first data source-specific query is associated with a first data source and the second data source-specific query is associated with a second data source that is different than the first data source.

In some aspects, the first data source is a public cloud and the second data source is a region, or the first data source is the region and the second data source is a virtual private cloud, or wherein the first data source is the virtual private cloud and the second data source is a private subnet, or wherein the first data source is the private subnet and the second data source is a target group of instances.

In some aspects, the set of chained data source-specific queries is chained from a public cloud to a target group of instances inside of a private subset associated with the public cloud.

In some aspects, the set of chained data source-specific queries comprises a third data source-specific query that is configured to be executed after the second data source-specific query, with the third source-specific query being chained to the second data source-specific query via a second field of the third data source-specific query that is linked to a second intermediate result of the second data source-specific query.

In some aspects, the set of chained data source-specific queries comprises a third data source-specific query that is configured to be executed before the second data source-specific query, with the second data source-specific query being chained to the third source-specific query via a second field of the second data source-specific query that is linked to a second intermediate result of the third data source-specific query.

In some aspects, the first intermediate result is paginated.

In some aspects, the DSL query result corresponds to a result of a final data source-specific query of the set of chained data source-specific queries, and the set of intermediate results comprises each intermediate result associated with each of the set of chained data source-specific queries except for the final data source-specific query of the set of chained data source-specific queries.

In some aspects, the first intermediate result of the first data source-specific query is a pre-fetched query result.

In some aspects, the reporting reports the DSL query result, or the reporting reports one or more intermediate results from the set of intermediate results, or a combination thereof.

In some aspects, computer-executable instructions that, when executed by the component, cause the component to:

In some aspects, computer-executable instructions that, when executed by the component, cause the component to:

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects and embodiments described herein and many attendant advantages thereof will be readily obtained as the same becomes better understood by reference to the following detailed description when considered in connection with the accompanying drawings which are presented solely for illustration and not limitation, and in which.

Figure 1:
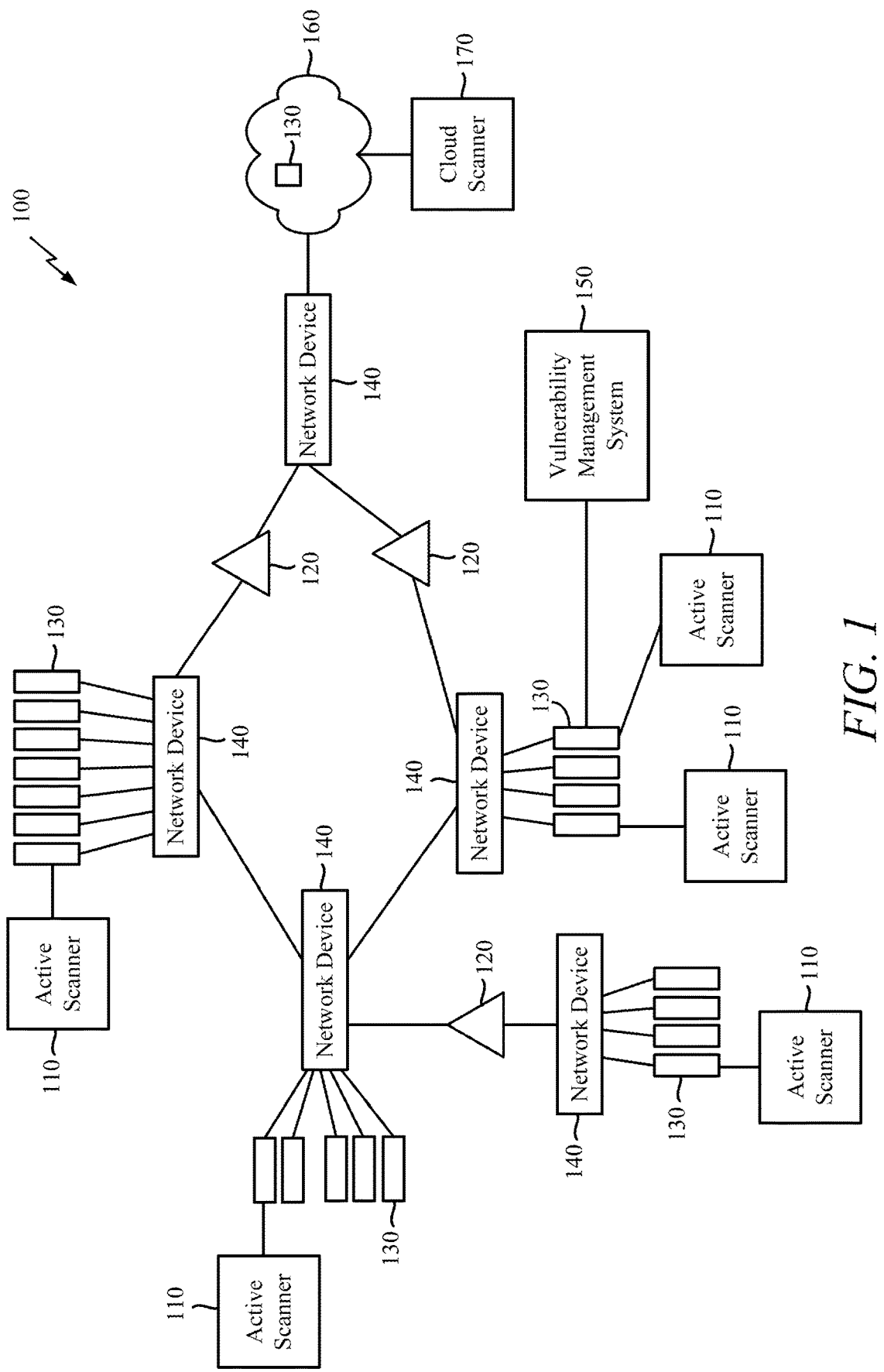
FIG. 1 illustrates an exemplary network having various assets that can be managed using a vulnerability management system, according to various aspects.

The accompanying drawings are presented to aid in the description of various aspects of the disclosure and are provided solely for illustration of the aspects and not limitation thereof.

DETAILED DESCRIPTION

Various aspects and embodiments are disclosed in the following description and related drawings to show specific examples relating to exemplary aspects and embodiments. Alternate aspects and embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage, or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects and/or embodiments may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the term "asset" and variants thereof may generally refer to any suitable uniquely defined electronic object that has been identified via one or more preferably unique but possibly non-unique identifiers or identification attributes (e.g., a universally unique identifier (UUID), a Media Access Control (MAC) address, a Network BIOS (NetBIOS) name, a Fully Qualified Domain Name (FQDN), an Internet Protocol (IP) address, a tag, a CPU ID, an instance ID, a Secure Shell (SSH) key, a user-specified identifier such as a registry setting, file content, information contained in a record imported from a configuration management database (CMDB), etc.). For example, the various aspects and embodiments described herein contemplate that an asset may be a physical electronic object such as, without limitation, a desktop computer, a laptop computer, a server, a storage device, a network device, a phone, a tablet, a wearable device, an Internet of Things (IoT) device, a set-top box or media player, etc. Furthermore, the various aspects and embodiments described herein contemplate that an asset may be a virtual electronic object such as, without limitation, a cloud instance, a virtual machine instance, a container, etc., a web application that can be addressed via a Uniform Resource Identifier (URI) or Uniform Resource Locator (URL), and/or any suitable combination thereof. Those skilled in the art will appreciate that the above-mentioned examples are not intended to be limiting but instead are intended to illustrate the ever-evolving types of resources that can be present in a modern computer network. As such, the various aspects and embodiments to be described in further detail below may include various techniques to manage network vulnerabilities according to an asset-based (rather than host-based) approach, whereby the various aspects and embodiments described herein contemplate that a particular asset can have multiple unique identifiers (e.g., a UUID and a MAC address) and that a particular asset can have multiples of a given unique identifier (e.g., a device with multiple network interface cards (NICs) may have multiple unique MAC addresses). Furthermore, as will be described in further detail below, the various aspects and embodiments described herein contemplate that a particular asset can have one or more dynamic identifiers that can change over time (e.g., an IP address) and that different assets may share a non-unique identifier (e.g., an IP address can be assigned to a first asset at a first time and assigned to a second asset at a second time). Accordingly, the identifiers or identification attributes used to define a given asset may vary with respect to uniqueness and the probability of multiple occurrences, which may be taken into consideration in reconciling the particular asset to which a given data item refers. Furthermore, in the elastic licensing model described herein, an asset may be counted as a single unit of measurement for licensing purposes. Further, assets may encompass tangential network aspects such as policies, rules and so forth.

Assets may also be implemented within or as part of cloud network architecture (e.g., cloud assets may correspond to instances or virtual machines (VMs), particular devices or groups of devices, distributed resources across multiple devices and/or locations, etc.) By way of examples, cloud assets may include, but are not limited to, any of the following examples which are characterized with respect to AMAZON, GOOGLE and MICROSOFT cloud services (e.g., Amazin Web Services, Microsoft Azure, Google Cloud), e.g.:

```
'aws_athena_database'
'aws_db_instance'
'aws_db_snapshot'
'aws_dynamodb_table'
'aws_ecr_repository'
'aws_ecr_repository_policy'
'aws_ecs_cluster'
'aws_ecs_service'
'aws_eks_cluster'
'aws_elb'
'aws_emr_cluster'
'aws_instance'
'aws_nat_gateway'
'aws_rds_cluster'
'aws_rds_cluster_instance'
'aws_redshift_cluster'
'aws_s3_bucket'
'aws_s3_bucket_policy'
'azurerm_container_group'
'azurerm_container_registry'
'azurerm_kubernetes_cluster'
'azurerm_lb'
'azurerm_linux_virtual_machine'
'azurerm_mariadb_server'
'azurerm_mssql_server'
'azurerm_mssql_virtual_machine'
'azurerm_mysql_database'
'azurerm_mysql_server'
'azurerm_postgresql_database'
'azurerm_postgresql_server'
'azurerm_sql_database'
'azurerm_sql_server'
'azurerm_storage_container'
'azurerm_virtual_machine_scale_set'
'azurerm_windows_virtual_machine'
'google_bigquery_dataset'
'google_bigquery_table'
```

-continued

```
'google_compute_forwarding_rule'
'google_compute_global_forwarding_rule'
'google_compute_instance'
'google_container_cluster'
'google_container_registry'
'google_sql_database'
'google_sql_database_instance'
'google_storage_bucket'
'kubernetes_cluster'
'kubernetes_pod'
```

According to various aspects, FIG. 1 illustrates an exemplary network 100 having various assets 130 that are interconnected via one or more network devices 140 and managed using a vulnerability management system 150. More particularly, as noted above, the assets 130 may include various types, including traditional assets (e.g., physical desktop computers, servers, storage devices, etc.), web applications that run self-supporting code, Internet of Things (IoT) devices (e.g., consumer appliances, conference room utilities, cars parked in office lots, physical security systems, etc.), mobile or bring-your-own-device (BYOD) resources (e.g., laptop computers, mobile phones, tablets, wearables, etc.), virtual objects (e.g., containers and/or virtual machine instances that are hosted within the network 100, cloud instances hosted in off-site server environments, etc.). Those skilled in the art will appreciate that the assets 130 listed above are intended to be exemplary only and that the assets 130 associated with the network 100 may include any suitable combination of the above-listed asset types and/or other suitable asset types. Furthermore, in various embodiments, the one or more network devices 140 may include wired and/or wireless access points, small cell base stations, network routers, hubs, spanned switch ports, network taps, choke points, and so on, wherein the network devices 140 may also be included among the assets 130 despite being labelled with a different reference numeral in FIG. 1.

According to various aspects, the assets 130 that make up the network 100 (including the network devices 140 and any assets 130 such as cloud instances that are hosted in an off-site server environment or other remote network 160) may collectively form an attack surface that represents the sum total of resources through which the network 100 may be vulnerable to a cyberattack. As will be apparent to those skilled in the art, the diverse nature of the various assets 130 make the network 100 substantially dynamic and without clear boundaries, whereby the attack surface may expand and contract over time in an often unpredictable manner thanks to trends like BYOD and DevOps, thus creating security coverage gaps and leaving the network 100 vulnerable. For example, due at least in part to exposure to the interconnectedness of new types of assets 130 and abundant software changes and updates, traditional assets like physical desktop computers, servers, storage devices, and so on are more exposed to security vulnerabilities than ever before. Moreover, vulnerabilities have become more and more common in self-supported code like web applications as organizations seek new and innovative ways to improve operations. Although delivering custom applications to employees, customers, and partners can increase revenue, strengthen customer relationships, and improve efficiency, these custom applications may have flaws in the underlying code that could expose the network 100 to an attack. In other examples, IoT devices are growing in popularity and address modern needs for connectivity but can also add scale and complexity to the network 100, which may lead to security vulnerabilities as IoT devices are often designed without security in mind. Furthermore, trends like mobility, BYOD, etc. mean that more and more users and devices may have access to the network 100, whereby the idea of a static network with devices that can be tightly controlled is long gone. Further still, as organizations adopt DevOps practices to deliver applications and services faster, there is a shift in how software is built and short-lived asses like containers and virtual machine instances are used. While these types of virtual assets can help organizations increase agility, they also create significant new exposure for security teams. Even the traditional idea of a perimeter for the network 100 is outdated, as many organizations are connected to cloud instances that are hosted in off-site server environments, increasing the difficulty to accurately assess vulnerabilities, exposure, and overall risk from cyberattacks that are also becoming more sophisticated, more prevalent, and more likely to cause substantial damage.

Accordingly, to address the various security challenges that may arise due to the network 100 having an attack surface that is substantially elastic, dynamic, and without boundaries, the vulnerability management system 150 may include various components that are configured to help detect and remediate vulnerabilities in the network 100.

More particularly, the network 100 may include one or more active scanners 110 configured to communicate packets or other messages within the network 100 to detect new or changed information describing the various network devices 140 and other assets 130 in the network 100. For example, in one implementation, the active scanners 110 may perform credentialed audits or uncredentialed scans to scan certain assets 130 in the network 100 and obtain information that may then be analyzed to identify potential vulnerabilities in the network 100. As used herein "credentialed" scans rely upon user credential(s) for authentication. Credentialed scans can perform a wider variety of checks than non-credentialed scans, which can result in more accurate scan results. Non-credentialed scans by contrast do not rely upon user credential(s) for authentication. More particularly, in one implementation, the credentialed audits may include the active scanners 110 using suitable authentication technologies to log into and obtain local access to the assets 130 in the network 100 and perform any suitable operation that a local user could perform thereon without necessarily requiring a local agent. Alternatively and/or additionally, the active scanners 110 may include one or more agents (e.g., lightweight programs) locally installed on a suitable asset 130 and given sufficient privileges to collect vulnerability, compliance, and system data to be reported back to the vulnerability management system 150. As such, the credentialed audits performed with the active scanners 110 may generally be used to obtain highly accurate host-based data that includes various client-side issues (e.g., missing patches, operating system settings, locally running services, etc.). On the other hand, the uncredentialed audits may generally include network-based scans that involve communicating packets or messages to the appropriate asset(s) 130 and observing responses thereto in order to identify certain vulnerabilities (e.g., that a particular asset 130 accepts spoofed packets that may expose a vulnerability that can be exploited to close established connections). Furthermore, as shown in FIG. 1, one or more cloud scanners 170 may be configured to perform a substantially similar function as the active scanners 110, except that the cloud scanners 170 may also have the ability to scan assets 130 like cloud instances that are hosted in a remote network 160 (e.g., an off-site server environment or other suitable cloud infrastructure).

Additionally, in various implementations, one or more passive scanners 120 may be deployed within the network 100 to observe or otherwise listen to traffic in the network 100, to identify further potential vulnerabilities in the network 100, and to detect activity that may be targeting or otherwise attempting to exploit previously identified vulnerabilities. In one implementation, as noted above, the active scanners 110 may obtain local access to one or more of the assets 130 in the network 100 (e.g., in a credentialed audit) and/or communicate various packets or other messages within the network 100 to illicit responses from one or more of the assets 130 (e.g., in an uncredentialed scan). In contrast, the passive scanners 120 may generally observe (or "sniff") various packets or other messages in the traffic traversing the network 100 to passively scan the network 100. In particular, the passive scanners 120 may reconstruct one or more sessions in the network 100 from information contained in the sniffed traffic, wherein the reconstructed sessions may then be used in combination with the information obtained with the active scanners 110 to build a model or topology describing the network 100. For example, in one implementation, the model or topology built from the information obtained with the active scanners 110 and the passive scanners 120 may describe any network devices 140 and/or other assets 130 that are detected or actively running in the network 100, any services or client-side software actively running or supported on the network devices 140 and/or other assets 130, and trust relationships associated with the various network devices 140 and/or other assets 130, among other things. In one implementation, the passive scanners 120 may further apply various signatures to the information in the observed traffic to identify vulnerabilities in the network 100 and determine whether any data in the observed traffic potentially targets such vulnerabilities. In one implementation, the passive scanners 120 may observe the network traffic continuously, at periodic intervals, on a pre-configured schedule, or in response to determining that certain criteria or conditions have been satisfied. The passive scanners 120 may then automatically reconstruct the network sessions, build or update the network model, identify the network vulnerabilities, and detect the traffic potentially targeting the network vulnerabilities in response to new or changed information in the network 100.

In one implementation, as noted above, the passive scanners 120 may generally observe the traffic traveling across the network 100 to reconstruct one or more sessions occurring in the network 100, which may then be analyzed to identify potential vulnerabilities in the network 100 and/or activity targeting the identified vulnerabilities, including one or more of the reconstructed sessions that have interactive or encrypted characteristics (e.g., due to the sessions including packets that had certain sizes, frequencies, randomness, or other qualities that may indicate potential backdoors, covert channels, or other vulnerabilities in the network 100). Accordingly, the passive scanners 120 may monitor the network 100 in substantially real-time to detect any potential vulnerabilities in the network 100 in response to identifying interactive or encrypted sessions in the packet stream (e.g., interactive sessions may typically include activity occurring through keyboard inputs, while encrypted sessions may cause communications to appear random, which can obscure activity that installs backdoors or rootkit applications). Furthermore, in one implementation, the passive scanners 120 may identify changes in the network 100 from the encrypted and interactive sessions (e.g., an asset 130 corresponding to a new e-commerce server may be identified in response to the passive scanners 120 observing an encrypted and/or interactive session between a certain host located in the remote network 160 and a certain port that processes electronic transactions). In one implementation, the passive scanners 120 may observe as many sessions in the network 100 as possible to provide optimal visibility into the network 100 and the activity that occurs therein. For example, in one implementation, the passive scanners 120 may be deployed at any suitable location that enables the passive scanners 120 to observe traffic going into and/or out of one or more of the network devices 140. In one implementation, the passive scanners 120 may be deployed on any suitable asset 130 in the network 100 that runs a suitable operating system (e.g., a server, host, or other device that runs Red Hat Linux or FreeBSD open source operating system, a UNIX, Windows, or Mac OS X operating system, etc.).

Furthermore, in one implementation, the various assets and vulnerabilities in the network 100 may be managed using the vulnerability management system 150, which may provide a unified security monitoring solution to manage the vulnerabilities and the various assets 130 that make up the network 100. In particular, the vulnerability management system 150 may aggregate the information obtained from the active scanners 110 and the passive scanners 120 to build or update the model or topology associated with the network 100, which may generally include real-time information describing various vulnerabilities, applied or missing patches, intrusion events, anomalies, event logs, file integrity audits, configuration audits, or any other information that may be relevant to managing the vulnerabilities and assets in the network 100. As such, the vulnerability management system 150 may provide a unified interface to mitigate and manage governance, risk, and compliance in the network 100.

Figure 2:
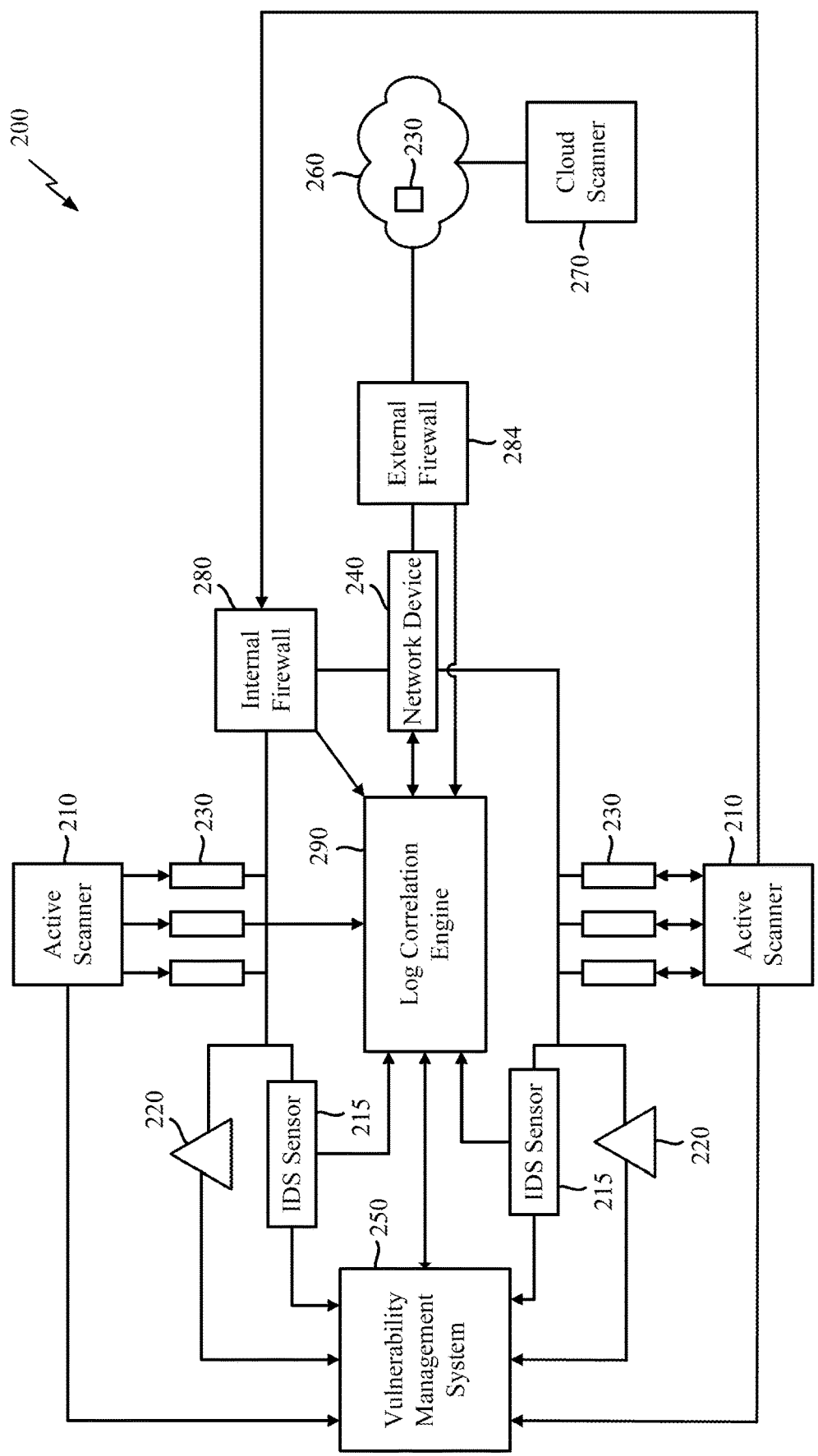
FIG. 2 illustrates another exemplary network having various assets that can be managed using a vulnerability management system, according to various aspects.

According to various aspects, FIG. 2 illustrates another exemplary network 200 with various assets 230 that can be managed using a vulnerability management system 250. In particular, the network 200 shown in FIG. 2 may have various components and perform substantially similar functionality as described above with respect to the network 100 shown in FIG. 1. For example, in one implementation, the network 200 may include one or more active scanners 210 and/or cloud scanners 270, which may interrogate assets 230 in the network 200 to build a model or topology of the network 200 and identify various vulnerabilities in the network 200, one or more passive scanners 220 that can passively observe traffic in the network 200 to further build the model or topology of the network 200, identify further vulnerabilities in the network 200, and detect activity that may potentially target or otherwise exploit the vulnerabilities. Additionally, in one implementation, a log correlation engine 290 may be arranged to receive logs containing events from various sources distributed across the network 200. For example, in one implementation, the logs received at the log correlation engine 290 may be generated by internal firewalls 280, external firewalls 284, network devices 240, assets 230, operating systems, applications, or any other suitable resource in the network 200. Accordingly, in one implementation, the information obtained from the active scanners 210, the cloud scanners 270, the passive scanners 220, and the log correlation engine 290 may be provided to the vulnerability management system 250 to generate or update a comprehensive model associated with the network 200 (e.g., topologies, vulnerabilities, assets, etc.).

In one implementation, the active scanners 210 may be strategically distributed in locations across the network 200 to reduce stress on the network 200. For example, the active scanners 210 may be distributed at different locations in the network 200 in order to scan certain portions of the network 200 in parallel, whereby an amount of time to perform the active scans may be reduced. Furthermore, in one implementation, one or more of the active scanners 210 may be distributed at a location that provides visibility into portions of a remote network 260 and/or offloads scanning functionality from the managed network 200. For example, as shown in FIG. 2, one or more cloud scanners 270 may be distributed at a location in communication with the remote network 260, wherein the term "remote network" as used herein may refer to the Internet, a partner network, a wide area network, a cloud infrastructure, and/or any other suitable external network. As such, the terms "remote network," "external network," "partner network," and "Internet" may all be used interchangeably to suitably refer to one or more networks other than the networks 100, 200 that are managed using the vulnerability management systems 150, 250, while references to "the network" and/or "the internal network" may generally refer to the areas that the systems and methods described herein may be used to protect or otherwise manage. Accordingly, in one implementation, limiting the portions in the managed network 200 and/or the remote network 260 that the active scanners 210 are configured to interrogate, probe, or otherwise scan and having the active scanners 210 perform the scans in parallel may reduce the amount of time that the active scans consume because the active scanners 210 can be distributed closer to scanning targets. In particular, because the active scanners 210 may scan limited portions of the network 200 and/or offload scanning responsibility to the cloud scanners 270, and because the parallel active scans may obtain information from the different portions of the network 200, the overall amount of time that the active scans consume may substantially correspond to the amount of time associated with one active scan.

As such, in one implementation, the active scanners 210 and/or cloud scanners 270 may generally scan the respective portions of the network 200 to obtain information describing vulnerabilities and assets in the respective portions of the network 200. In particular, the active scanners 210 and/or cloud scanners 270 may perform the credentialed and/or uncredentialed scans in the network in a scheduled or distributed manner to perform patch audits, web application tests, operating system configuration audits, database configuration audits, sensitive file or content searches, or other active probes to obtain information describing the network. For example, the active scanners 210 and/or cloud scanners 270 may conduct the active probes to obtain a snapshot that describes assets actively running in the network 200 at a particular point in time (e.g., actively running network devices 240, internal firewalls 280, external firewalls 284, and/or other assets 230). In various embodiments, the snapshot may further include any exposures that the actively running assets to vulnerabilities identified in the network 200 (e.g., sensitive data that the assets contain, intrusion events, anomalies, or access control violations associated with the assets, etc.), configurations for the actively running assets (e.g., operating systems that the assets run, whether passwords for users associated with the assets comply with certain policies, whether assets that contain sensitive data such as credit card information comply with the policies and/or industry best practices, etc.), or any other information suitably describing vulnerabilities and assets actively detected in the network 200. In one implementation, in response to obtaining the snapshot of the network 200, the active scanners 210 and/or cloud scanners 270 may then report the information describing the snapshot to the vulnerability management system 250, which may use the information provided by the active scanners 210 to remediate and otherwise manage the vulnerabilities and assets in the network.

Furthermore, in one implementation, the passive scanners 220 may be distributed at various locations in the network 200 to monitor traffic traveling across the network 200, traffic originating within the network 200 and directed to the remote network 260, and traffic originating from the remote network 260 and directed to the network 200, thereby supplementing the information obtained with the active scanners 210. For example, in one implementation, the passive scanners 220 may monitor the traffic traveling across the network 200 and the traffic originating from and/or directed to the remote network 260 to identify vulnerabilities, assets, or information that the active scanners 210 may be unable to obtain because the traffic may be associated with previously inactive assets that later participate in sessions on the network. Additionally, in one implementation, the passive scanners 220 may be deployed directly within or adjacent to an intrusion detection system sensor 215, which may provide the passive scanners 220 with visibility relating to intrusion events or other security exceptions that the intrusion detection system (IDS) sensor 215 identifies. In one implementation, the IDS may be an open source network intrusion prevention and detection system (e.g., Snort), a packet analyzer, or any other system that having a suitable IDS sensor 215 that can detect and prevent intrusion or other security events in the network 200.

Accordingly, in various embodiments, the passive scanners 220 may sniff one or more packets or other messages in the traffic traveling across, originating from, or directed to the network 200 to identify new network devices 240, internal firewalls 280, external firewalls 284, or other assets 230 in addition to open ports, client/server applications, any vulnerabilities, or other activity associated therewith. In addition, the passive scanners 220 may further monitor the packets in the traffic to obtain information describing activity associated with web sessions, Domain Name System (DNS) sessions, Server Message Block (SMB) sessions, File Transfer Protocol (FTP) sessions, Network File System (NFS) sessions, file access events, file sharing events, or other suitable activity that occurs in the network 200. In one implementation, the information that the passive scanners 220 obtains from sniffing the traffic traveling across, originating from, or directed to the network 200 may therefore provide a real-time record describing the activity that occurs in the network 200. Accordingly, in one implementation, the passive scanners 220 may behave like a security motion detector on the network 200, mapping and monitoring any vulnerabilities, assets, services, applications, sensitive data, and other information that newly appear or change in the network 200. The passive scanners 220 may then report the information obtained from the traffic monitored in the network to the vulnerability management system 250, which may use the information provided by the passive scanners 220 in combination with the information provided from the active scanners 210 to remediate and otherwise manage the network 200.

In one implementation, as noted above, the network 200 shown in FIG. 2 may further include a log correlation engine 290, which may receive logs containing one or more events from various sources distributed across the network 200 (e.g., logs describing activities that occur in the network 200, such as operating system events, file modification events, USB device insertion events, etc.). In particular, the logs received at the log correlation engine 290 may include events generated by one or more of the internal firewalls 280, external firewalls 284, network devices 240, and/or other assets 230 in the network 200 in addition to events generated by one or more operating systems, applications, and/or other suitable sources in the network 200. In one implementation, the log correlation engine 290 may normalize the events contained in the various logs received from the sources distributed across the network 200, and in one implementation, may further aggregate the normalized events with information describing the snapshot of the network 200 obtained by the active scanners 210 and/or the network traffic observed by the passive scanners 220. Accordingly, in one implementation, the log correlation engine 290 may analyze and correlate the events contained in the logs, the information describing the observed network traffic, and/or the information describing the snapshot of the network 200 to automatically detect statistical anomalies, correlate intrusion events or other events with the vulnerabilities and assets in the network 200, search the correlated event data for information meeting certain criteria, or otherwise manage vulnerabilities and assets in the network 200.

Furthermore, in one implementation, the log correlation engine 290 may filter the events contained in the logs, the information describing the observed network traffic, and/or the information describing the snapshot of the network 200 to limit the information that the log correlation engine 290 normalizes, analyzes, and correlates to information relevant to a certain security posture (e.g., rather than processing thousands or millions of events generated across the network 200, which could take a substantial amount of time, the log correlation engine 290 may identify subsets of the events that relate to particular intrusion events, attacker network addresses, assets having vulnerabilities that the intrusion events and/or the attacker network addresses target, etc.). Alternatively (or additionally), the log correlation engine 290 may persistently save the events contained in all of the logs to comply with regulatory requirements providing that all logs must be stored for a certain period of time (e.g., saving the events in all of the logs to comply with the regulatory requirements while only normalizing, analyzing, and correlating the events in a subset of the logs that relate to a certain security posture). As such, the log correlation engine 290 may aggregate, normalize, analyze, and correlate information received in various event logs, snapshots obtained by the active scanners 210 and/or cloud scanners 270, and/or the activity observed by the passive scanners 220 to comprehensively monitor, remediate, and otherwise manage the vulnerabilities and assets in the network 200. Additionally, in one implementation, the log correlation engine 290 may be configured to report information relating to the information received and analyzed therein to the vulnerability management system 250, which may use the information provided by the log correlation engine 290 in combination with the information provided by the passive scanners 220, the active scanners 210, and the cloud scanners 270 to remediate or manage the network 200.

Accordingly, in various embodiments, the active scanners 210 and/or cloud scanners 270 may interrogate any suitable asset 230 in the network 200 to obtain information describing a snapshot of the network 200 at any particular point in time, the passive scanners 220 may continuously or periodically observe traffic traveling in the network 200 to identify vulnerabilities, assets, or other information that further describes the network 200, and the log correlation engine 290 may collect additional information to further identify the vulnerabilities, assets, or other information describing the network 200. The vulnerability management system 250 may therefore provide a unified solution that aggregates vulnerability and asset information obtained by the active scanners 210, the cloud scanners 270, the passive scanners 220, and the log correlation engine 290 to comprehensively manage the network 200.

Security auditing applications typically display security issues (such as vulnerabilities, security misconfigurations, weaknesses, etc.) paired with a particular solution for that given issue. Certain security issues may share a given solution, or have solutions which are superseded or otherwise rendered unnecessary by other reported solutions. Embodiments of the disclosure relate to improving an efficiency by which security issues are reported, managed and/or rectified based on solution supersedence.

In accordance with a first embodiment, when working with security reporting datasets with sparse metadata available, the reported solutions for each security issue are combined, and various "rulesets" are applied against the combined solutions to de-duplicate them and remove solutions that have been superseded by other solutions. As used herein, a ruleset is a set of rules that govern when a solution is to be removed or merged with another and how that merge is to be accomplished. In an example, when solution texts not matching a given ruleset are discovered they are flagged for manual review. Examples of rules that may be included in one or more rulesets are as follows:

If there is more than one matching solution in the solution list, remove all but one of those solutions.

For solutions matching "Upgrade to <product> x·y·z" where x, y, and z are integers, select a single result with the highest x·y·z value (comparing against x first, then y, then z).

For solutions matching "Apply fix <fix> to <product>", create a new combined solution where <fix> for each solution is concatenated into a comma separated list for a given <product>.

In accordance with a second embodiment, when working with datasets with metadata available that have an identifier that allows grouping of solutions based on product (e.g., common product enumeration (CPE)) and timestamp information on when a fix has become available, the solutions for each group can be filtered with only display the latest "top level" solution for each group being displayed. In an example, the first and second embodiments can be implemented in conjunction with each other to produce a further refined solution set.

As used herein, a "plug-in" contains logic and metadata for an individual security check in a security auditing application. A plugin may check for one or more mitigations/fixes and flag one or more individual security issues. CPE is a standardized protocol of describing and identifying classes of applications, operating systems, and hardware devices present among an enterprise's computing assets. CPE identifiers contain asset type information (OS/Hardware/Application), vendor, product, and can even contain version information. An example CPE string is "cpe:/o:microsoft:windows_vista:6.0:sp1", where "/o" stands for operating system, Microsoft is the vendor, windows_vista is the product, major version is 6.0, and minor version is SP1. Further, a common vulnerabilities and exposures (CVE) identifier is an identifier from a national database maintained by NIST/Mitre which keeps a list of known vulnerabilities and exposures. An example identifier would be "CVE-2014-6271" which corresponds to the "ShellShock" vulnerability in the database.

In accordance with one implementation of the second embodiment, solutions (or solution 'texts') may first together based on the CPEs in the plugins they were reported in. The solutions are then sorted by the patch publication date from the plugins which they were sourced from. Solutions containing text that matches a pattern that indicates that the solution is likely a patch recommendation can all be removed from the group except the solution associated with the most recent patch. In this manner, patches with identifiers that cannot be easily sorted (e.g., patches with non-numerical identifiers) and/or for which no ruleset pertains in accordance with the first embodiment can be filtered out from the solution set. In some implementations, additional ruleset-based filtering from the first embodiment can also be applied, to filter out (or de-duplicate) additional duplicate solution information.

In accordance with a third embodiment, a security auditing application may evaluate further metadata in the solution report results that is added based upon asset-specific information (e.g., such as individual patches installed, which mitigations and patches are missing, what individual software installations are installed, patch supersedence information, the relationship between the mitigations/patches and security issues, etc.).

Web applications can be an essential way to conduct business. Unfortunately, web applications can also be vulnerable to attacks (e.g., denial of service, disclosure of private information, network infiltration, etc.) due to their exposure to public internet. Thus, addressing vulnerabilities before an attacker can exploit them is a high priority. Web application scanning (WAS) can be performed to identify vulnerabilities associated with web applications. For example, a web application scanner (or simply "scanner") may be used to scan externally accessible website page for vulnerable web applications.

WAS scans may take a relatively long time to perform, and many scans of redundant web pages or substantially redundant web pages may be performed. For example, a newly scanned web page may include only altered content (e.g., text, images, video, etc.) without any functional alterations, making that scan redundant.

When crawling a web application, a large number of web pages are discovered. Hence, deciding which of these web pages to audit via a security audit scan, and which will provide little to no benefit in auditing via the security audit scan, may help to reduce WAS scan times.

Figure 3:
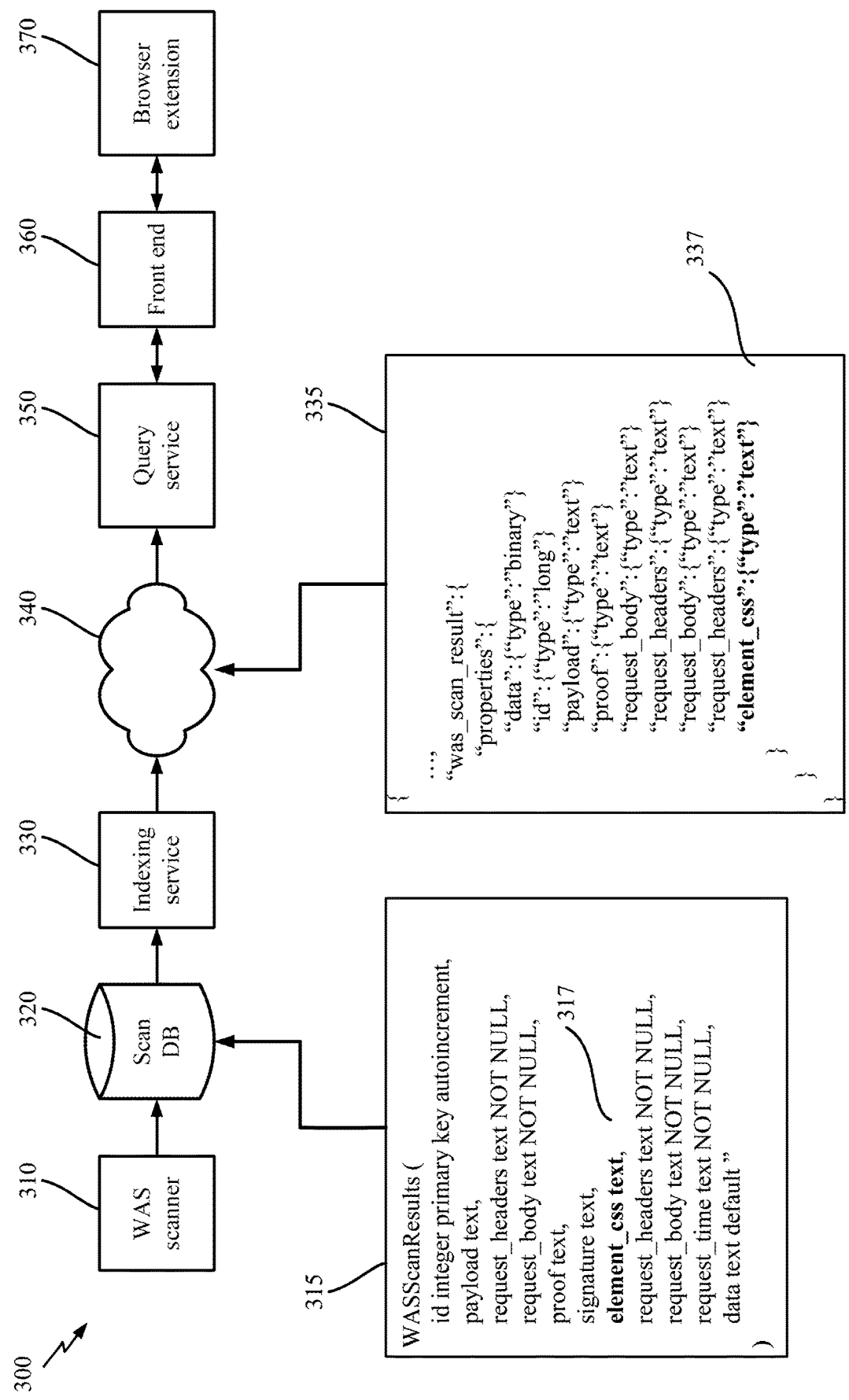
FIG. 3 illustrates a diagram of an example system suitable for interactive remediation of vulnerabilities of web applications based on scanning of web applications.

According to various aspects, FIG. 3 illustrates a diagram of an example system 300 suitable for interactive remediation of vulnerabilities of web applications based on scanning of web applications. In particular, as shown in FIG. 3, the system 300 may include a WAS scanner (or simply "scanner") 310, a scan results 320 (e.g., a database (DB)), a first cloud service 330, a search engine 340, a second cloud service 350, a front end 360, and a browser extension 370. The first and second cloud services 330, 350 may be a same cloud service or different cloud services.

Generally, the scanner 310 may include an element selector for the vulnerable element as a part of its result placed into the scan results 320. Examples (not necessarily exhaustive) of an element selector may include CSS selector, XPath selector, Node number selector, Name selector, Id selector, LinkText selector, and so on. This information may then be passed into the search engine 340 by the first cloud service 330 and included in results from the second cloud service 350 when queried for data about specific vulnerabilities, e.g., from the front end 360. If an element selector exists, the front end 360 (e.g., browser) may include a button that links back to the vulnerable URL and element.

The scanner 310 may be configured to scan web pages to identify one or more vulnerabilities of web applications, i.e., vulnerabilities of elements in web pages. In particular, the scanner 310 may include a selector (not shown) for the vulnerable element in the scan results 320. For example, the selector may implement a scanner function (selector create function) that will take the current element and produce an element selector from it. The URL the element appears on may be included as separate data. A final test may be run before including the data to ensure that the element can be gotten to or otherwise accessible without any extra browser steps that the system is unaware of. Such data may be kept in a table in the scan results 320. For example, a FIG. 3 illustrates a VulnerabilitiesDetected table 315, which includes a field for an element selector 317 denoted as "element_css", which is of text type.

The first cloud service 330 may be configured to index the search results within scan results 320. In particular, the first cloud service 330 may be configured to ensure that the field for the element selector 317 is included when the search engine 340 performs a search. In FIG. 3, it is seen the "was_scan_results" 335 data includes the element selector data 337, which is denoted as "element_css":{"type": "text"}.

The second cloud service 350 may be configured to query the search engine 340 for results of WAS scanning, e.g., performed by the scanner 310. In particular, the second cloud service 350 may be configured to query the search engine 340 for the element selector data 337. For example, the second cloud service 350 may submit the following query to pick up the element selector data 337 and return its response, e.g., to the front end 360.

GET /scans/{scanId}/hosts/{hostId}/plugins/{pluginId}

The front end 360 may be configured to receive the WAS scanning results data, including the element selector data for the vulnerable elements. The front end 360 may also be configured to include a button or some other visible element, which when activated (e.g., pressed by a user) will pass message to the browser extension 370 (e.g., chrome extension). The front end 360 may pass at least the following data in the message to the browser extension 370:

1. URL
2. Element selector
3. Plugin ID

The browser extension 370 may be configured to take the message passed from the front end 360, open the URL, and highlight and snap to the vulnerable element. In an aspect, the browser extension 370 may open the URL in a new tab of the browser.

Figure 4:
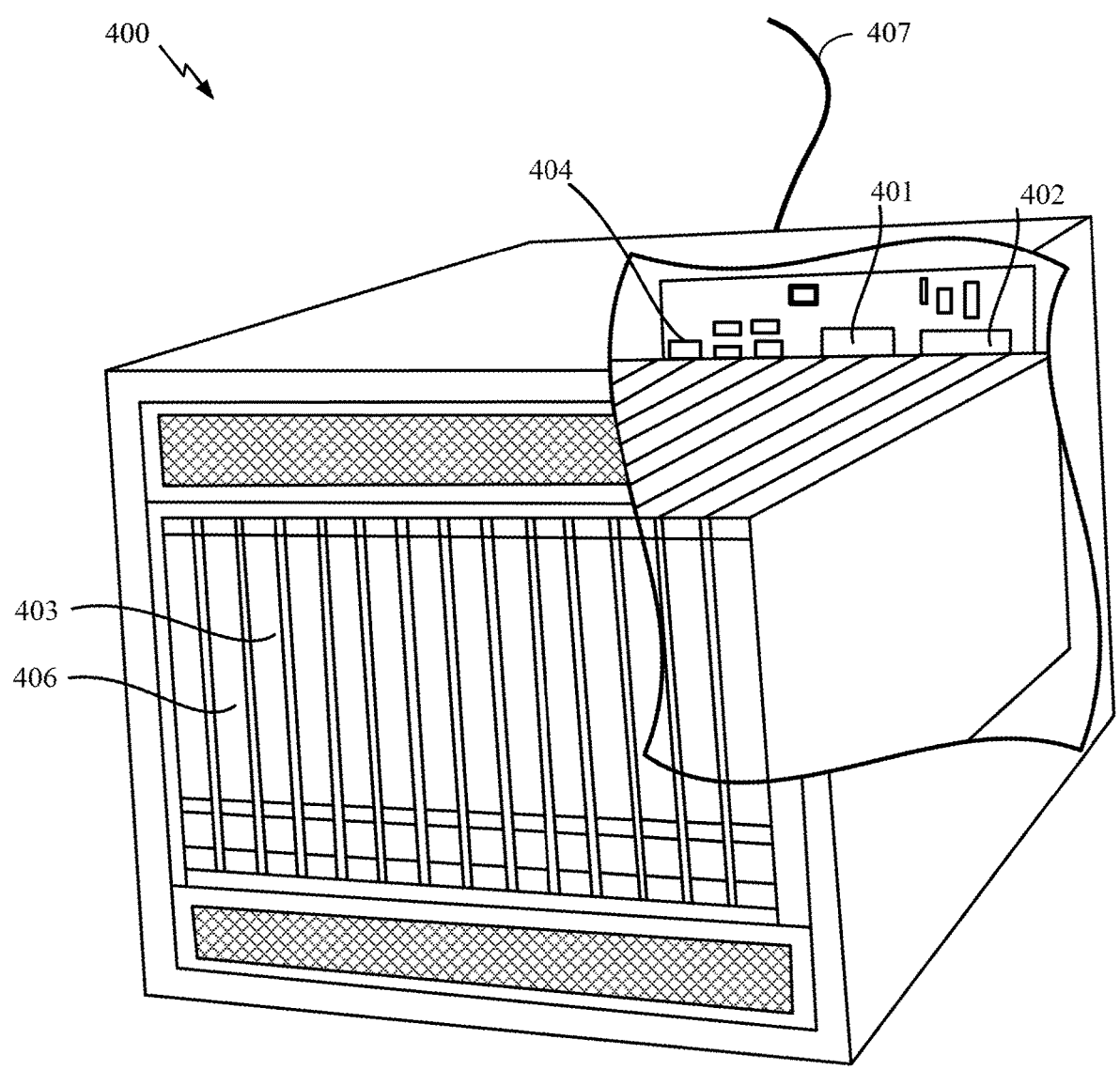
FIG. 4 illustrates a server, according to aspects of the disclosure.

The various embodiments may be implemented on any of a variety of commercially available server devices, such as server 400 illustrated in FIG. 4. In an example, the server 400 may correspond to one example configuration of a server on which a security auditing application may execute, which in certain implementations may be included as part of the vulnerability management system 150 of FIG. 1 or the vulnerability management system 250 of FIG. 2 or WAS scanner 300 of FIG. 3. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet.

Figure 5:
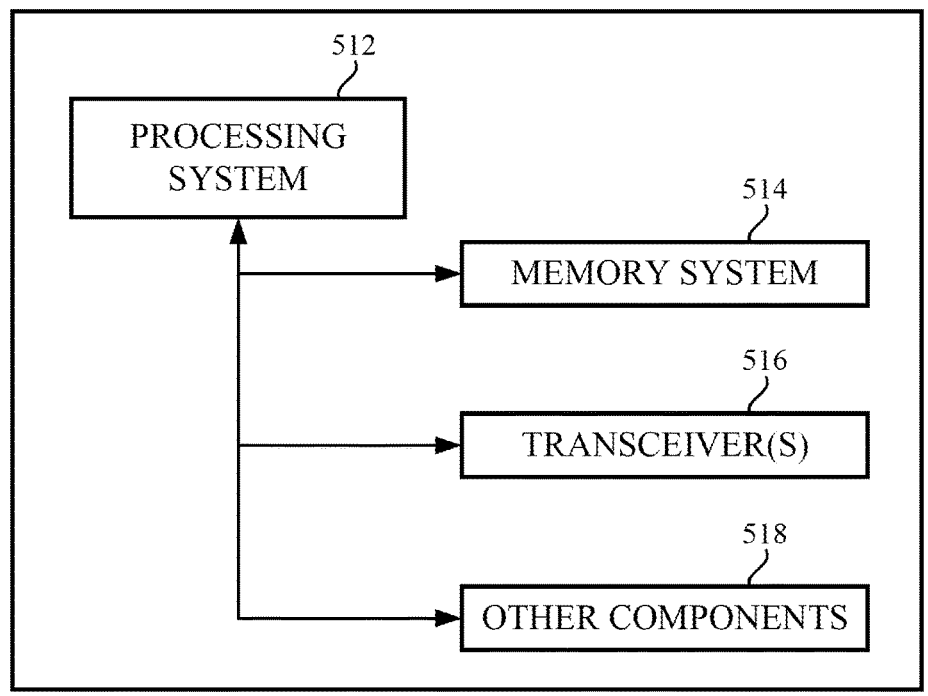
FIG. 5 generally illustrates a user equipment (UE) in accordance with aspects of the disclosure.

While FIG. 4 illustrates an example whereby a server-type apparatus 400 may implement various processes of the disclosure, in other aspects various aspects of the disclosure may execute on a user equipment (UE), such as UE 510 depicted in FIG. 5.

FIG. 5 generally illustrates a UE 510 in accordance with aspects of the disclosure. In some designs, UE 510 may correspond to any UE-type that is capable of executing the process(es) in accordance with aspects of the disclosure, including but not limited to a mobile phone or tablet computer, a laptop computer, a desktop computer, a wearable device (e.g., smart watch, etc.), and so on. The UE 510 depicted in FIG. 5 includes a processing system 512, a memory system 514, and at least one transceiver 516. The UE 510 may optionally include other components 518 (e.g., a graphics card, various communication ports, etc.).

When attempting to discover asset relationships, security risks, exposure semantics, attack paths and to perform general security analytics, an analyst or automated system must execute multiple queries in a specific order against generic Large Data Sets from a variety of sources. In some designs, the result set from such queries could result in expected data items, but the order of queries executed must be based on the well-known relationships between different entities and resource types. Based on the relationship, the analytics queries may need to provide the output of a query as input to the subsequent queries. Implementing such queries manually in any search platform is tedious, error-prone, unpredictable and resource intensive.

Another problem that arises with the above querying technique is that an analyst or automated system requires rewriting or duplicating parts of the old query for every new search or discovery query for new use cases. That means analysts are not able to reuse the knowledge of previous queries to construct newer queries due to lack of technology that can allow usage of previously constructed queries as primitives.

A Domain specific language (DSL) is usually less complex than a general-purpose language, such as Java, C, or Ruby. Generally, DSLs are developed in close coordination with the experts in the field for which the DSL is being designed. In many cases, DSLs are intended to be used not by software people, but instead by non-programmers who are fluent in the domain of the DSL addresses.

As one DSL example, DSL JavaScript Object Notation (JSON) provides a simple yet powerful query language for the JSON Request Application Programming Interface (API). In some designs, a JSON query can be:

A valid query string for default deftype (the standard query parser in most cases), as in, title:solr.

A valid local parameters query string, as in, {!dismax qf=myfield}solr rocks.

A JSON object with query parser name and arguments. The special key v in local parameters is replaced by key query in JSON object query, as in this example:

```
{
    "query-parser-name" : {
        "param1": "value1",
        "param2": "value2",
        "query": "a-json-query",
        "another-param": "another-json-query"
    }
}
```

Aspects of the disclosure are directed to chaining DSL-based queries (e.g., whereby chained DSL-based queries may execute sequentially and automatically). In some designs, chaining DSL-based queries makes it possible for an analyst to define and write the queries and data mapping between them (e.g., in a simple to understand JSON), which is a purpose-built engine that can execute to produce the desired output. In some designs, query chaining DSL facilitates parametrization of queries via DSL and also allows analysts to store previously tested queries as primitives and then later use these primitives to construct further complex queries. Such aspects may provide various technical advantages, such as faster implementation data source-specific queries and/or more simplified implementation data source-specific queries of large data sets from various data sources.

Figure 6:
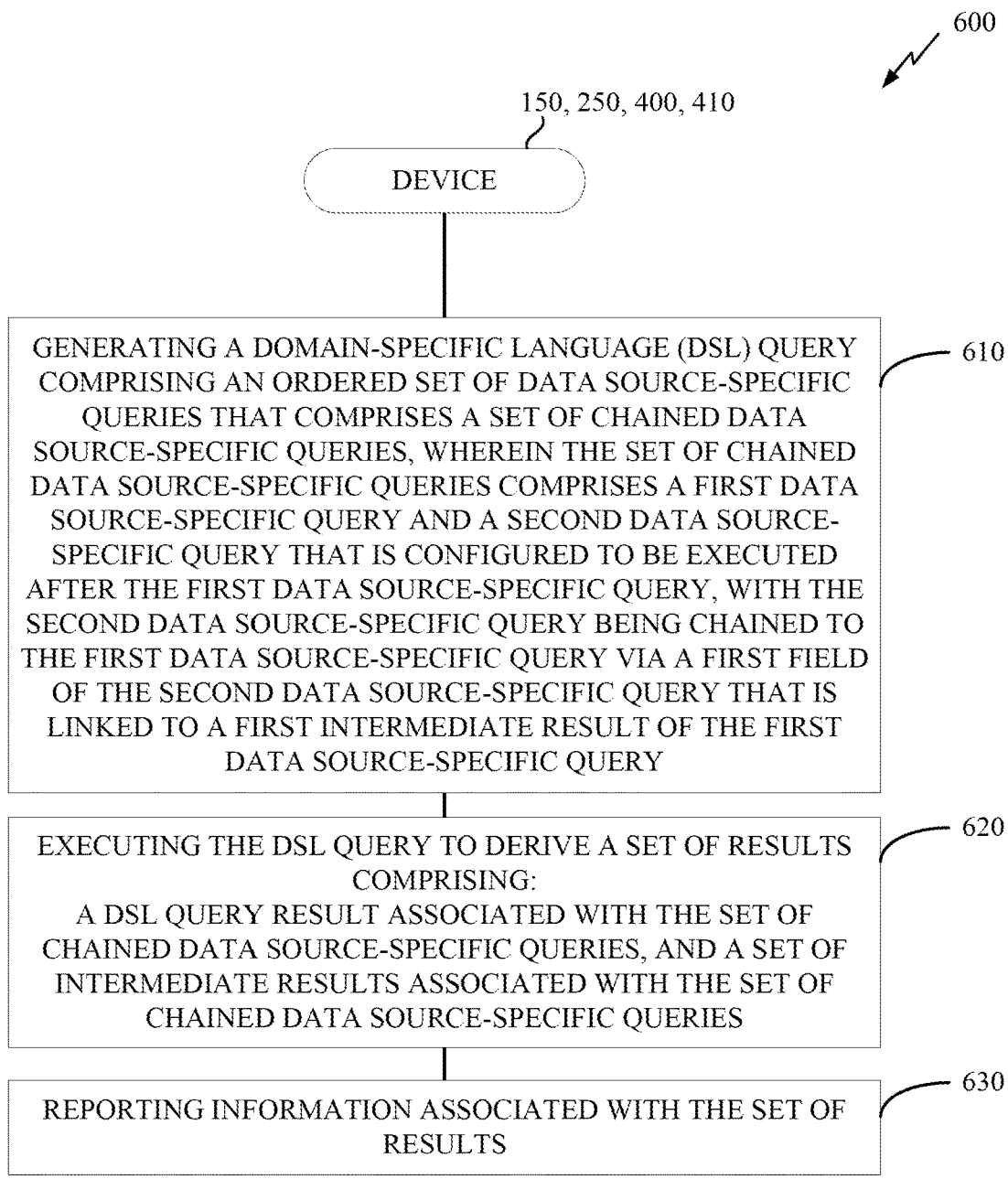
FIG. 6 illustrates a process, in accordance with aspects of the disclosure.

FIG. 6 illustrates a process 600, in accordance with aspects of the disclosure. The process 600 of FIG. 6 may be performed by a component, such as vulnerability management system 150, vulnerability management system 250, server 400 or UE 510.

Referring to FIG. 6, at 610, the component (e.g., processor(s) 401, processing system 512, etc.) generates a domain-specific language (DSL) query comprising an ordered set of data source-specific queries that comprises a set of chained data source-specific queries. In an aspect, the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result (or output) of the first data source-specific query.

Referring to FIG. 6, at 620, the component (e.g., processor(s) 401, processing system 512, etc.) executes the DSL query to derive a set of results comprising: a DSL query result associated with the set of chained data source-specific queries, and a set of intermediate results associated with the set of chained data source-specific queries.

Referring to FIG. 6, at 630, the component (e.g., processor(s) 401, processing system 512, etc.) reports information associated with the set of results.

Referring to FIG. 6, in some designs, the DSL query is a DSL JavaScript Object Notation (JSON) query.

Referring to FIG. 6, in some designs, the first field of the second data source-specific query inputs the first intermediate result (or output) of the first data source-specific query as a primitive.

Referring to FIG. 6, in some designs, the first data source-specific query is associated with a first data source and the second data source-specific query is associated with a second data source that is different than the first data source, e.g.:

1. the first data source is a public cloud (e.g., an external interface to a cloud network) and the second data source is a region (e.g., a regional network server or controller), or
2. the first data source is the region and the second data source is a virtual private cloud (e.g., a service that permits resources to be launched in a logically isolated virtual network, which may be customer designed/configured in some designs), or
3. the first data source is the virtual private cloud and the second data source is a private subnet (e.g., a subnet associated with a routing table that does not lead to an Internet gateway), or
4. the first data source is the private subnet and the second data source is a target group of instances (e.g., Amazon EC2 instances, Azure instances or VMs, Google instances or VMs, etc.).

Referring to FIG. 6, in some designs, the set of chained data source-specific queries is chained from a public cloud to a target group of instances inside of a private subset associated with the public cloud.

Referring to FIG. 6, in some designs, the set of chained data source-specific queries comprises a third data source-specific query that is configured to be executed after the second data source-specific query, with the third source-specific query being chained to the second data source-specific query via a second field of the third data source-specific query that is linked to a second intermediate result of the second data source-specific query. In other words, the set of chained data source-specific queries may span any number of levels (of a data source hierarchy).

Referring to FIG. 6, in some designs, the set of chained data source-specific queries comprises a third data source-specific query that is configured to be executed before the second data source-specific query, with the second data source-specific query being chained to the third source-specific query via a second field of the second data source-specific query that is linked to a second intermediate result of the third data source-specific query. In other words, a data source-specific query may be directly chained (or linked) to any number of intermediate results of other data source-specific query in the set of chained data source-specific queries.

Referring to FIG. 6, in some designs, the first intermediate result is paginated (e.g., to reduce the result size by filtering out certain data).

Referring to FIG. 6, in some designs, the DSL query result corresponds to a result of a final data source-specific query of the set of chained data source-specific queries, and the set of intermediate results comprises each intermediate result associated with each of the set of chained data source-specific queries except for the final data source-specific query of the set of chained data source-specific queries.

Referring to FIG. 6, in some designs, the first intermediate result of the first data source-specific query is a pre-fetched query result.

Referring to FIG. 6, in some designs, the reporting of 630 reports the DSL query result, or the reporting of 630 reports one or more intermediate results from the set of intermediate results, or a combination thereof.

Referring to FIG. 6, in some designs, the component further transforms the set of results into a graph data set, and the reporting at 630 reports the graph data set.

Referring to FIG. 6, in some designs, the component further scans the set of results to detect an attack chain stage associated with an intrusion.

Referring to FIG. 6, in a specific example, the intermediate results (or primitives) are simply pre-tested queries represented in purpose-built DSL, which facilitates productivity and reusability. In some designs, the reusability feature allows an analyst to reuse primitives as knowledge base to discover base conditions for example: an analyst could use primitive called "ExposedEC2Instances" to discover just exposed ec2 instances within AWS dataset and then can add a new DSL based query to discover Connected S3 buckets, the new query can be stored as another primitive called "EC2ConnectedS3Buckets". Now, by chaining these two primitives queries analysts can discover all ec2 instances that are exposed to the internet and have connected paths to s3 buckets, e.g.:

"ExposedEC2Instances"+
  "EC2ConnectedS3Buckets"=All Exposed Instances with S3 connections.

Figure 7:
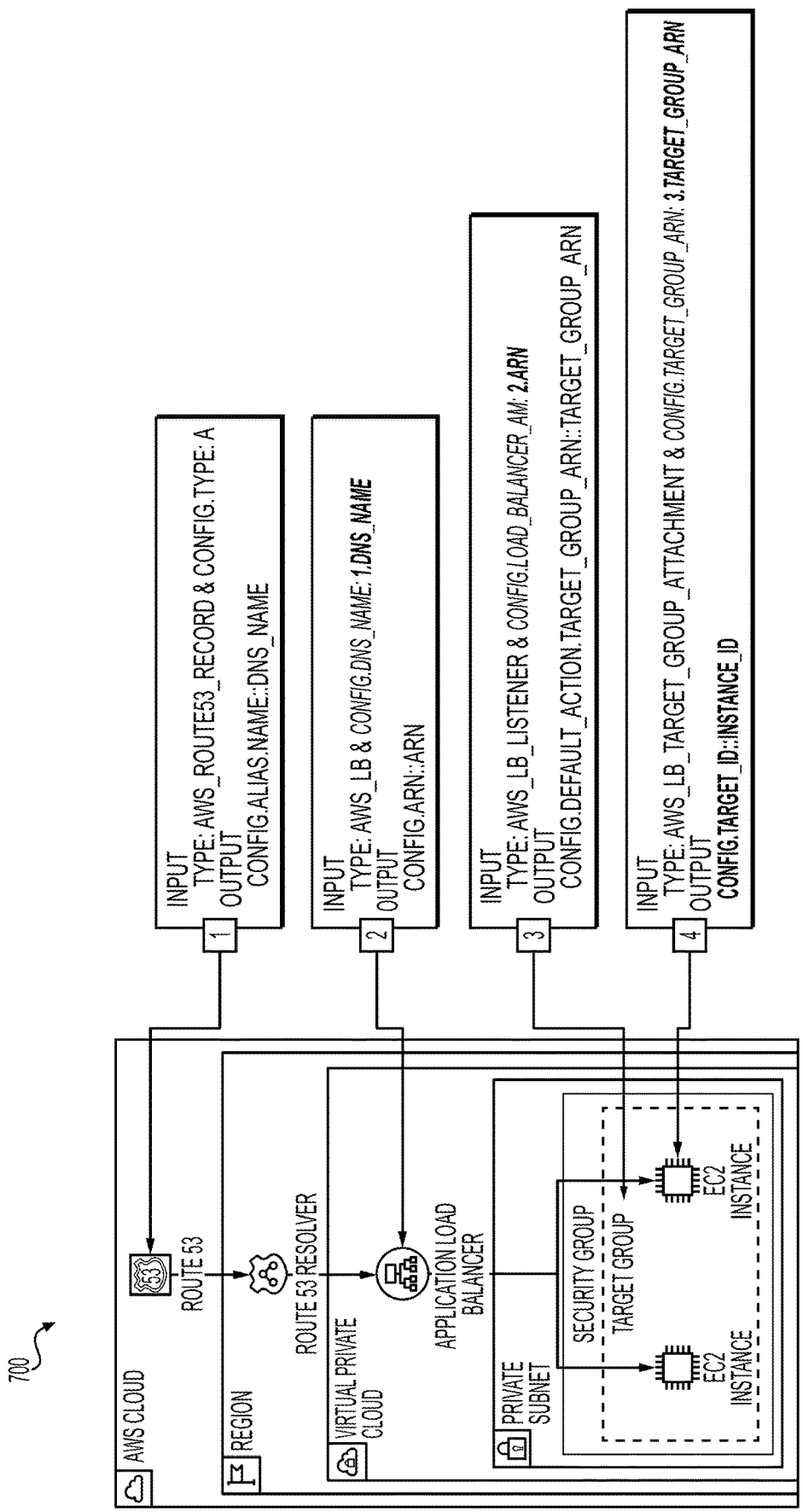
FIGS. 7 and 8 illustrate example implementations of the process of FIG. 6, in accordance with aspects of the disclosure.
Figure 8:
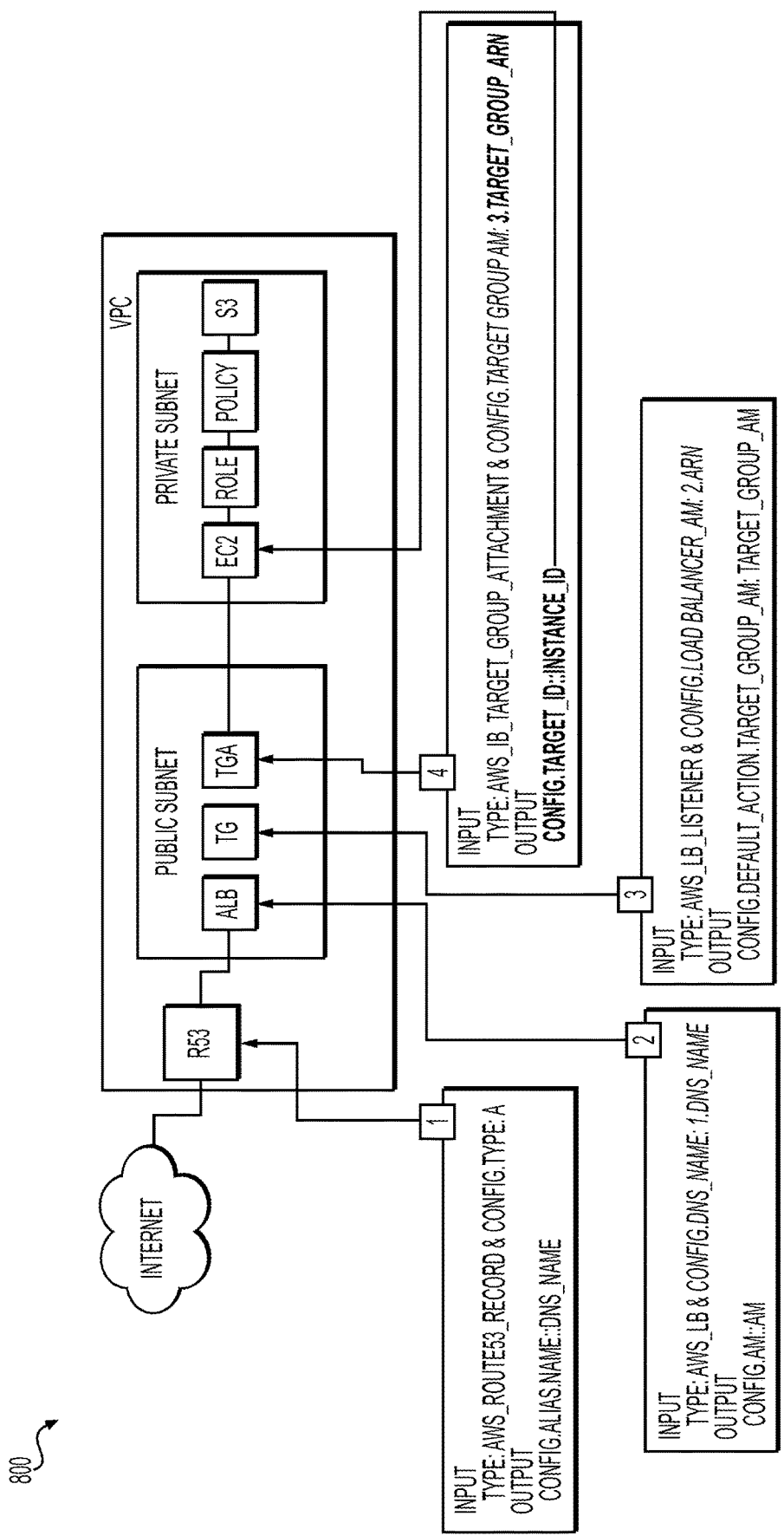
Figure 9:
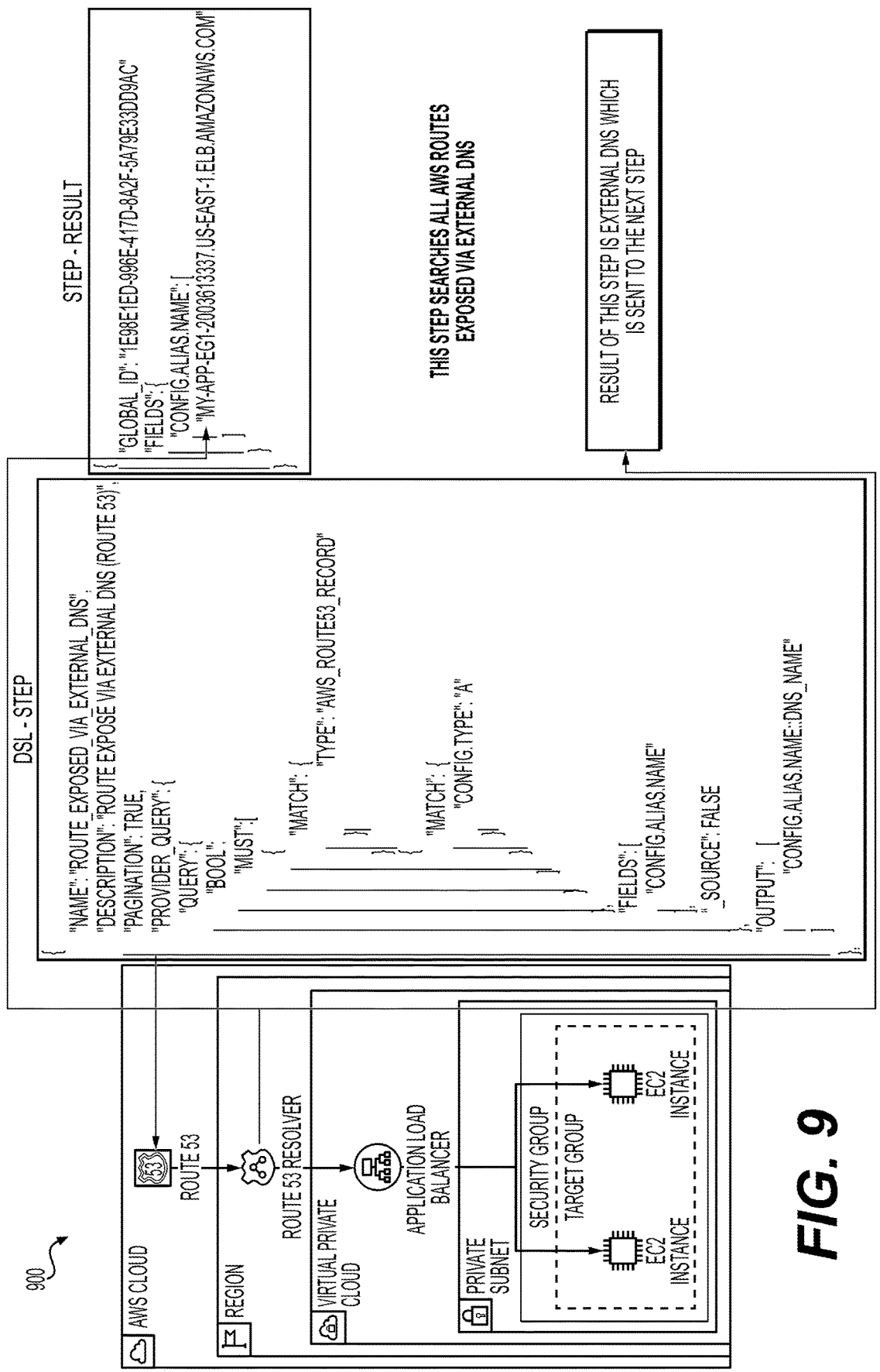
FIGS. 9-14 illustrates more detailed implementations of the process of FIG. 7, in accordance with aspects of the disclosure.
Figure 10:
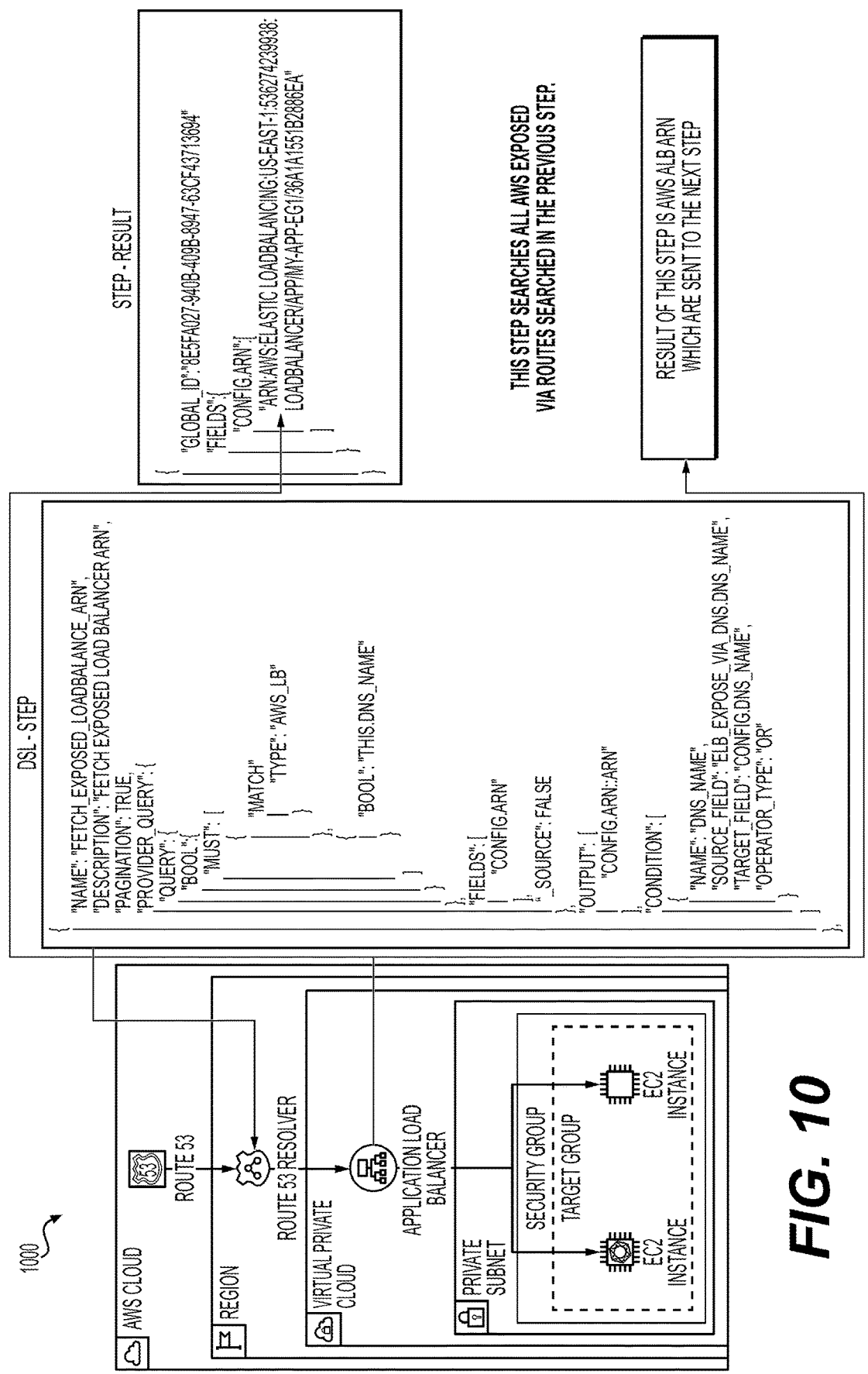
Figure 11:
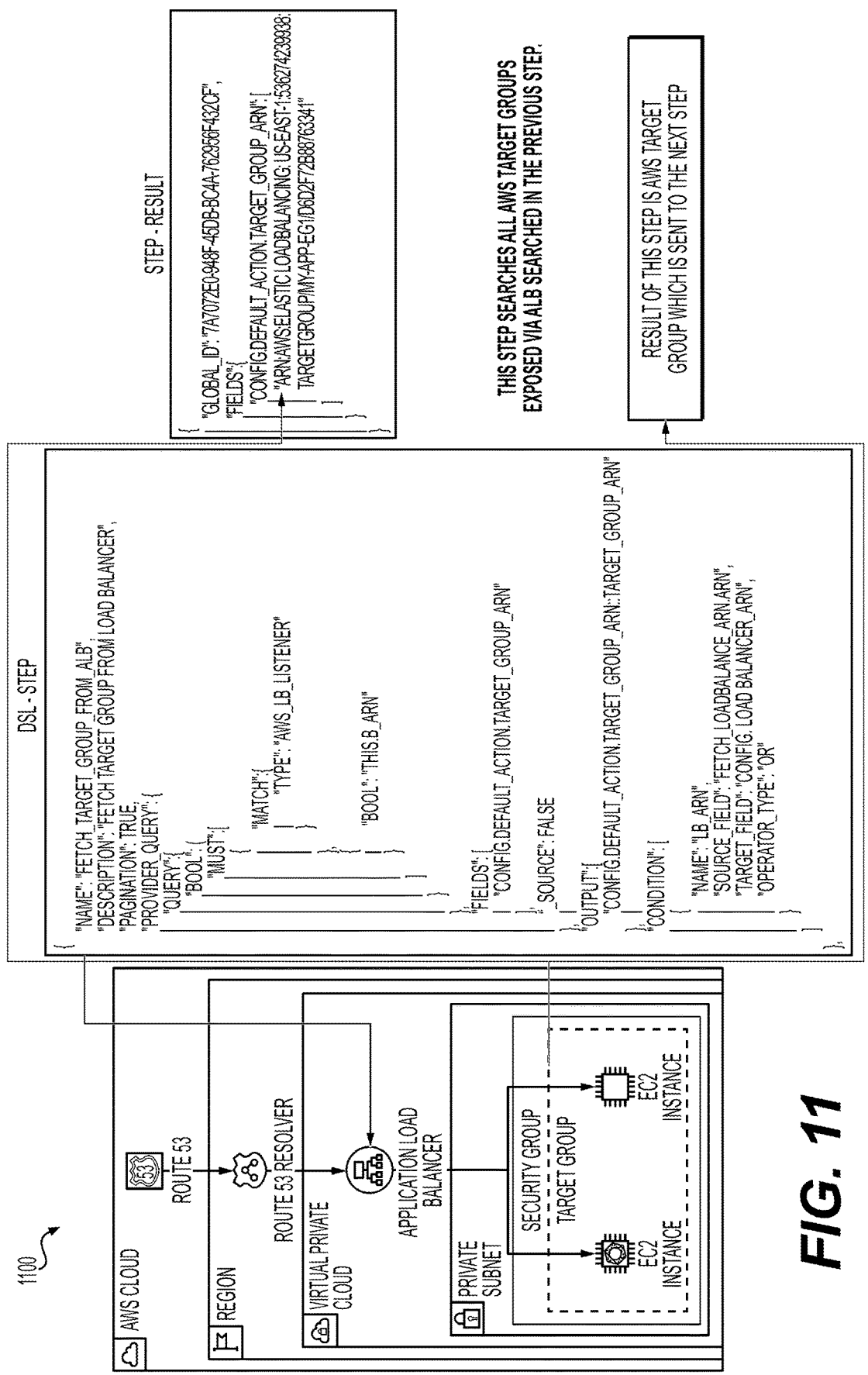
Figure 12:
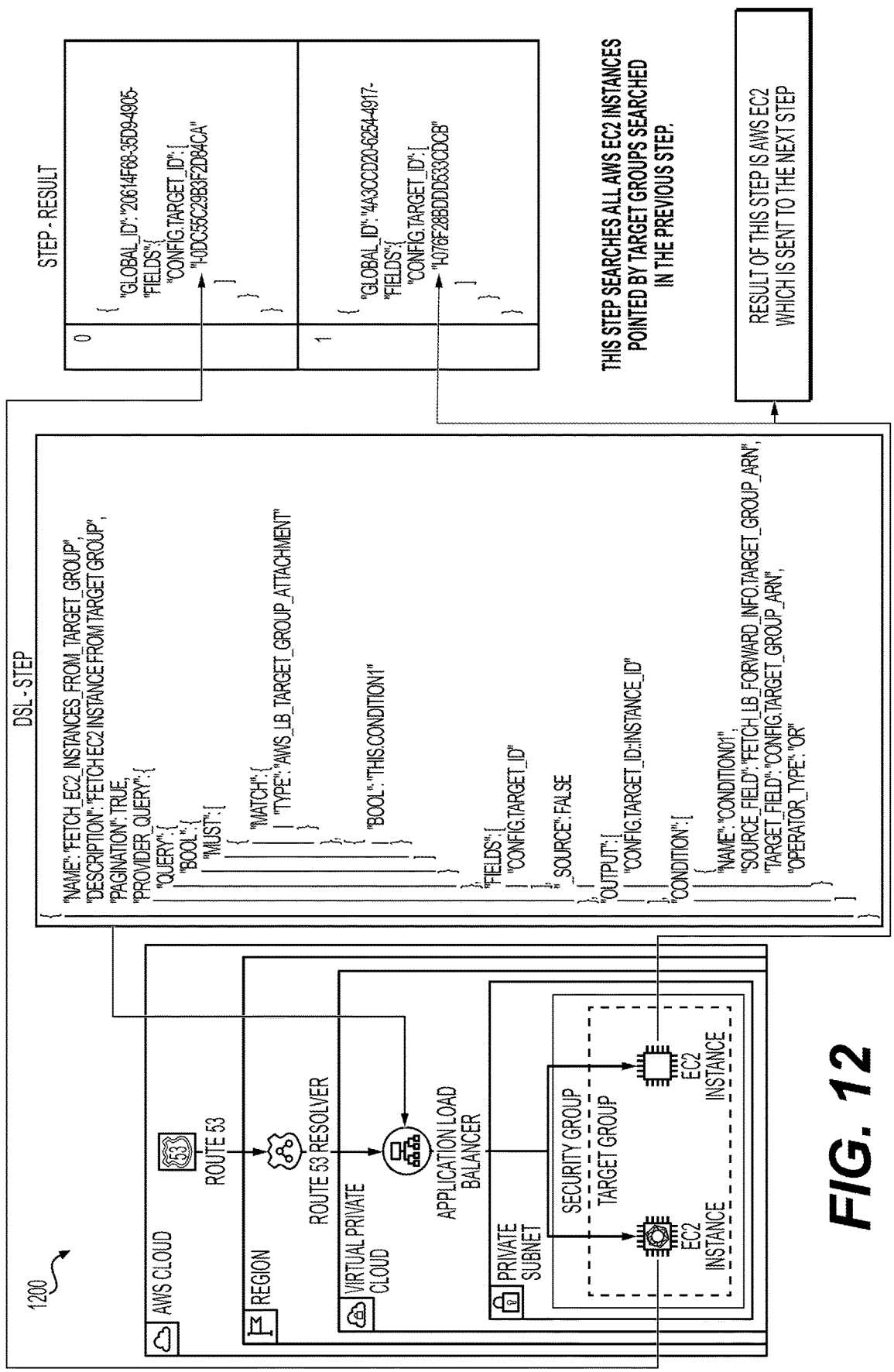
Figure 13A:
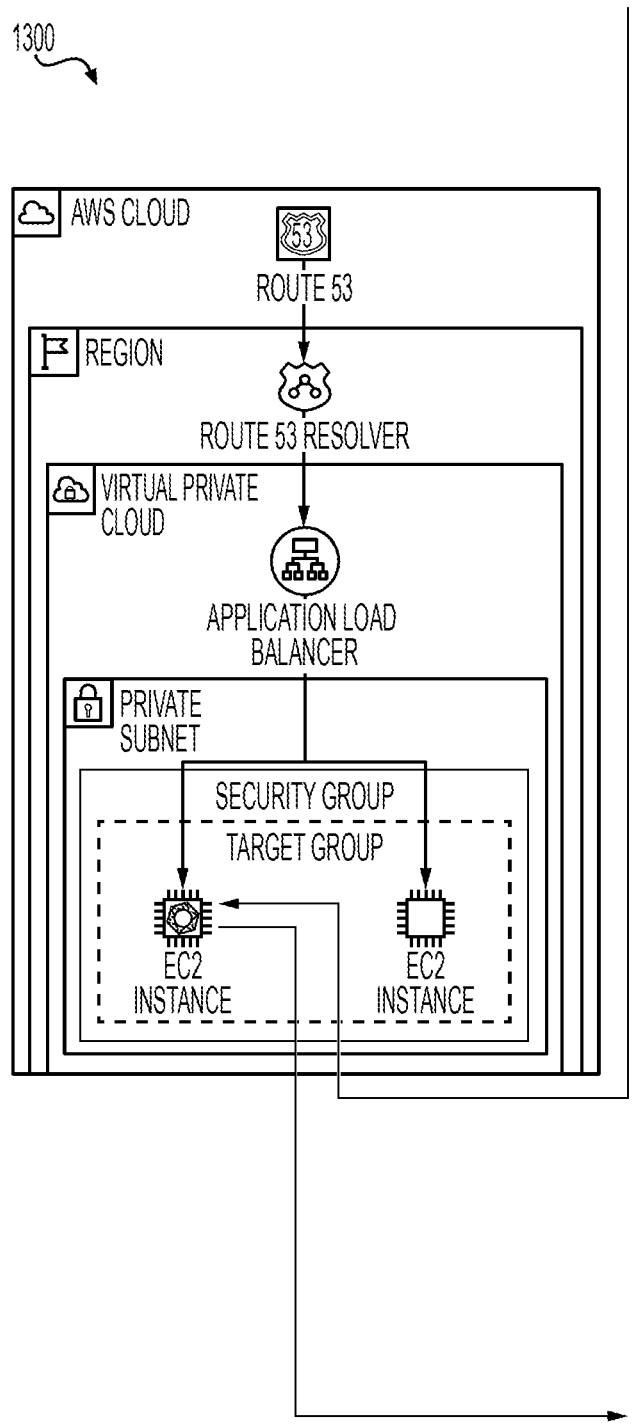
Figure 14:
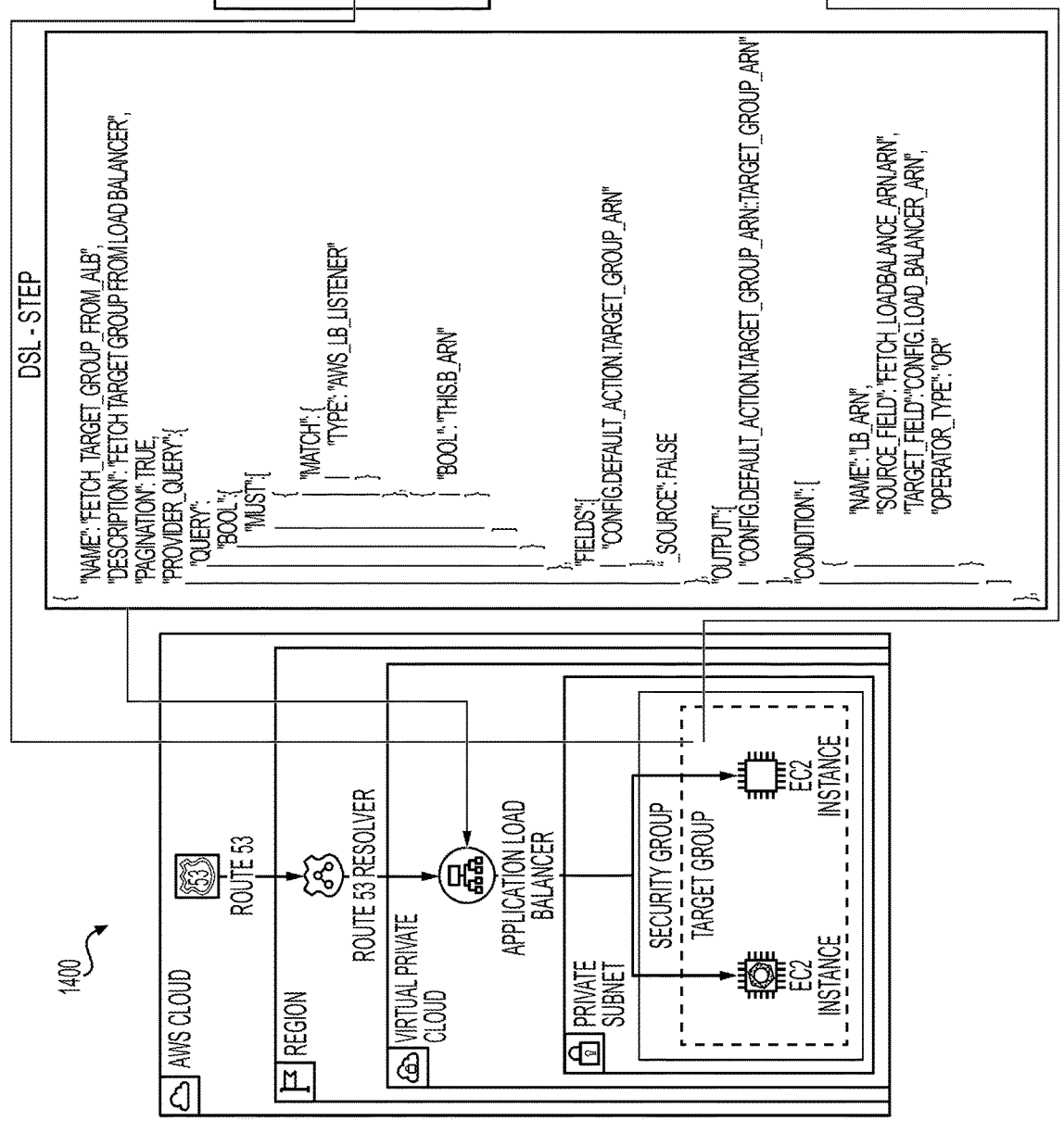

Referring to FIG. 6, in a specific example, semantics for a DSL comprising query chain(s) may be defined as follows:

name: statement allows user to provide a short text representing the set of queries
description: statement allows user to provide a long text about the set of queries
explanation: statement allows user to provide a text explaining the use case
provider: statement representing the underlying search engine—ElasticSearch, Java Database Connectivity (JDBC), Representational State Transfer (REST), etc.
include: statement allows the user to include external existing DSL enabling sharing and reusability.
data: statement allows the user to provide a generic set of data which can be referred in by any condition in any step. It allows the user to parameterize the DSL
steps: an ordered collection of queries
name: statement allows user to provider a short text representing the query description: statement allows user to provider a long text about the query
  provider: statement representing the underlying search engine-ElasticSearch, Splunk JDBC, REST
  provider_query: statement allows user to provider the raw query specific to the provider, dynamic condition can be referred based on the defined 'condition'
  output: statement allows the user to provide a list of fields from query output to be stored for use by other queries. Other queries can refer the field using the notion 'step.name.fieldname'
  condition: an ordered collection of conditions
    name: statement allows user to provider a short text which can used by the
    'provider_query' to refer the specific condition
    source_field: statement allows the user to define values that form the right hand side (RHS) of the condition
    target_field: statement allows the user to specify the left hand side (LHS) variable of the condition
    operator: supported the operator are 'OR' and 'AND', condition are constructed based on the operator FIGS. 7 and 8 illustrate example implementations 700-800 of the process 600 of FIG. 6, in accordance with aspects of the disclosure. In particular, the example implementations 700-800 are associated with a DSL query comprising changes queries specific to an Amazon Web Services (AWS) system.

Referring to FIG. 7, at (1), a query is directed to AWS Route 53 (note that AWS Route 53 is a highly available and scalable Domain Name System (DNS) web service. Route 53 connects user requests to internet applications running on AWS or on-premises). At (2), the intermediate result from (1) is incorporated as an input to a query that is directed to an Application Load Balancer of a Virtual Private Cloud. At (3), the intermediate result from (2) is incorporated as an input to a query that is directed to a target group of instances in a Private Subnet. At (4), the intermediate result from (3) is incorporated as an input to a query that is directed to a target ec2 instance. In this example, the output of (4) is the final DSL query result. Note that FIG. 8 is similar to FIG. 7, except query (3) is directed to a transit gateway (TG) in the Public Subnet.

Referring to FIGS. 7-8, in a specific example, a DSL query request may be configured as follows, e.g.:
  GET /v1/api/query/vuln-instance-hosting-app?offset=0&limit=10 HTTP/1.1
  Host: localhost:9023
  x-container-uuid: adc0bc07-8775-4ee9-ale0-548cabfbdf50
  x-user-uuid: test Referring to FIGS. 7-8, in a specific example, a DSL query response may be configured as follows, e.g.:

```
{
  "reference_id": "ab2f7379-c2dd-4974-afe9-e140a20ffb18",
  "name": "vuln-instance-hosting-app",
  "description": "Vulnerable AWS instance hosting application",
  "labels": null,
  "total_result_count": 1,
  "response_count": {
    "count": 1,
    "limit": 10,
    "offset": 0
  },
  "last_updated_at": "2023-01-19T19:29:10Z",
  "execution_duration": "67.786433ms", "results": [
    {
      "global_id": "8141372b-9abf-4534-bfa1-5ba559db8083",
      "fields": {
        "config.id": [
          "i-0dc55c29b3f2d84ca"
        ],
        "updated_at": [
          "2023-01-04T22:40:16.232Z"
        ],
        "vulnerability.name": [
          "Amazon Linux 2 : kernel (ALASKERNEL-5.15-2022-007)",
          "Amazon Linux 2 : microcode_ctl (ALAS-2022-1842)"
        ]
      }
    }
  ],
  "steps": [
    "elb_expose_via_dns",
    "fetch_loadbalance_arn",
    "fetch_lb_forward_info",
    "fetch_lb_target_instance",
    "fetch_vulnerability_aws_instance"
  ]
}
```

Note that while FIGS. 7-8 relate to an AWS-specific implementation, aspects of the disclosure may be directed to various data sources, e.g., Vulnerability, Cloud security posture management (CSPM), Kubernetes security posture management (KSPM), Web Application Scanners (WAS), Identity modules, etc., using data source-specific queries. In some designs, aspects of the disclosure reduce, minimize or eliminate the need for data to be transformed into a common schema, including a relationship graph for deriving meaningful security insight. In some designs, aspects of the disclosure provide the analyst or automated system visibility into the output of each query in the DSL, not just the result of the final query, which is a significant advance over the approach where a single query is executed on a common centralized data store. In some designs, the intermediate result(s) are a critical set of information when analyzing an attack path. For example, Adversarial Tactics, Techniques & Common Knowledge (ATT&CK) is one example of an attack chain taxonomy developed by MITRE. The aim of ATT&CK as defined by MITRE is to categorize adversary behavior to help improve post-compromise detection of advanced intrusions. Software vulnerabilities (CVEs) play an important role in cyber-intrusions, and are mostly classified into four ATT&CK techniques, which cover the exploitation phases (or stages) of the attack chain.

FIGS. 9-14 illustrates more detailed implementations 900-1400 of the process 700 of FIG. 7, in accordance with aspects of the disclosure. In particular, the FIGS. 9-14 depict code-level implementations that depict the query code followed by the response code.

Figure 15A:
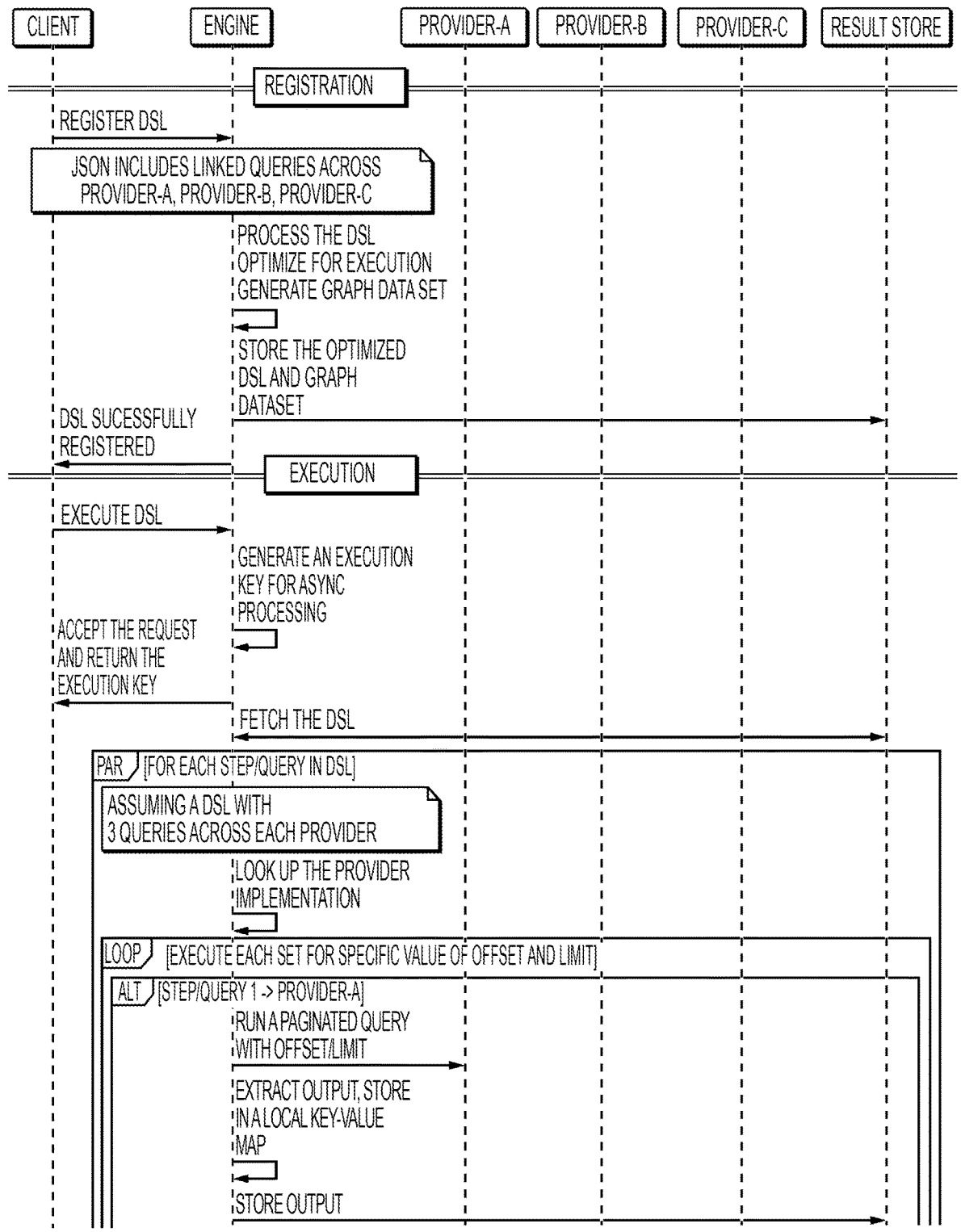
FIGS. 15A-15B illustrate an example implementation of the process of FIG. 6, in accordance with aspects of the disclosure.
Figure 15B:
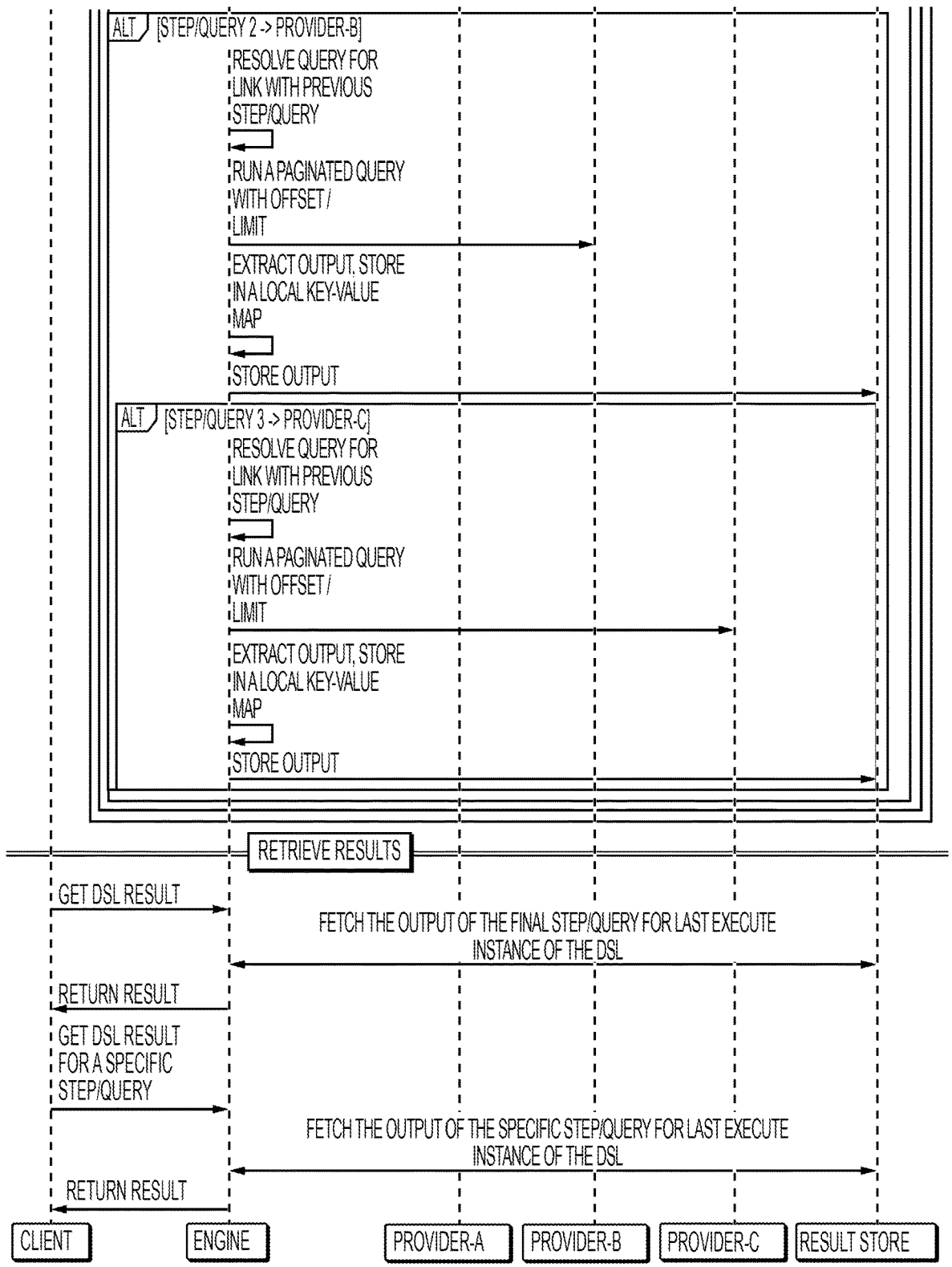

FIGS. 15A-15B illustrates an example implementation of the process 600 of FIG. 6, in accordance with aspects of the disclosure. In particular, FIGS. 15A-15B depict a DSL JSON that includes linked (or chained) queries across providers (or data sources) A-C. In particular, the process of FIG. 15 assumes a DSL with 3 queries across each provider (e.g., query 1 is directed to Provider-A, an output of which is incorporated into query 2 directed to Provider-B, an output of which is incorporated into query 3 directed to Provider C). As noted above, such linked/chained queries would typically be implemented via a manual and painstaking process.

Referring to FIG. 6, one application of the process 600 is to facilitate a vulnerability management system (e.g., Tenable.one) to correlate data across several Tenable products in order to hunt possible Interconnected Attack Paths. In an aspect, these attack paths may use data from several different security products that Tenable sells where each dataset represents an isolated security loophole within a component of a large complex system (such as cloud infrastructure). In an aspect, attackers may utilize their experience and skill to join these isolated security loopholes to create a connected graph of loopholes which then can be triggered as a complete attack path. Such interconnected attack paths within complex architectures (such as cloud infrastructure) should ideally be detected before the attackers discover them and join the dots. To this end, aspects of the disclosure are directed to chained DSL-based queries that link each security loophole (reported by isolated products) targeting a subsystem together to form a connected attack path within a complex system.

Figure 16:
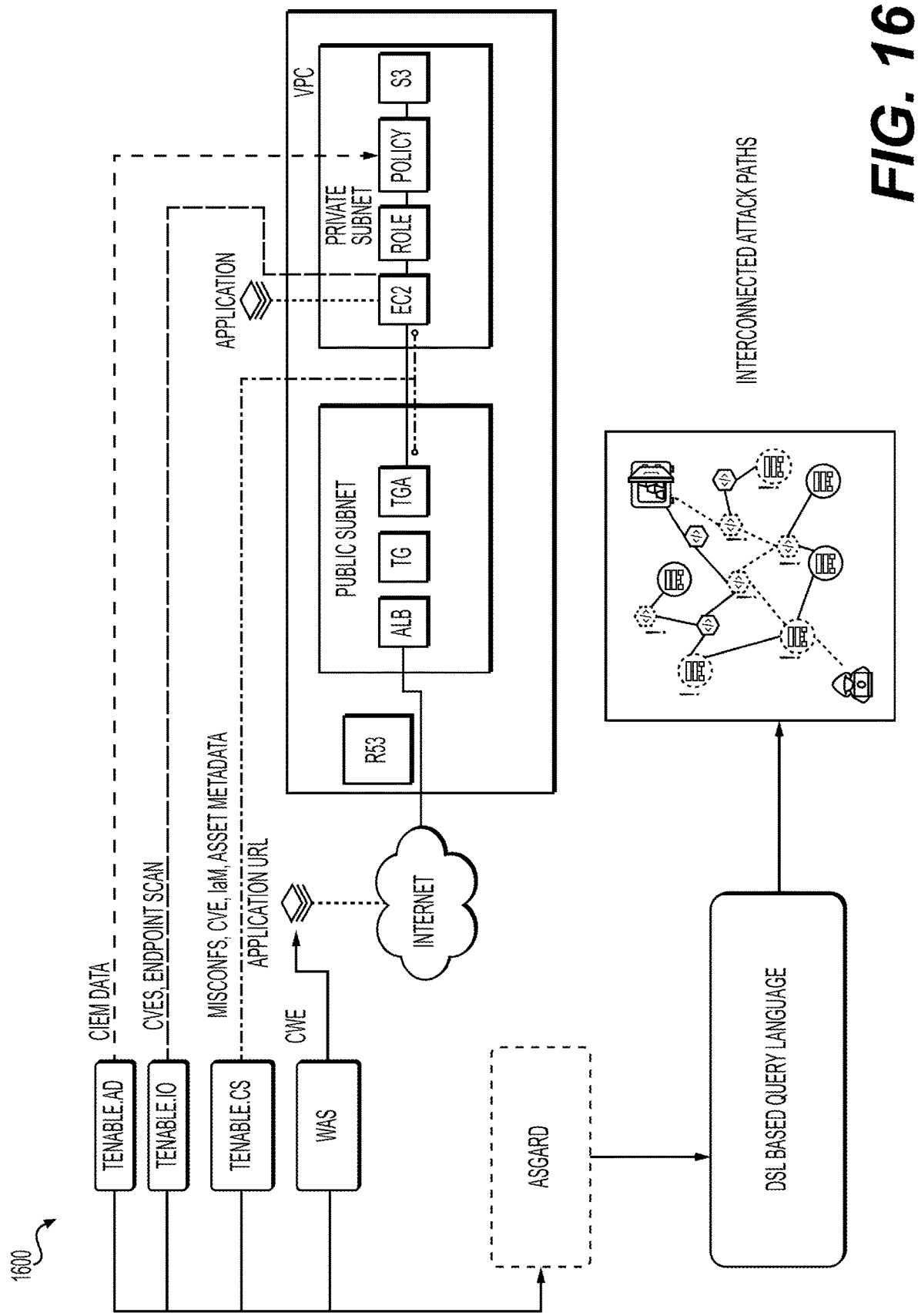
FIG. 16 illustrates an example implementation of the process of FIG. 6, in accordance with aspects of the disclosure.

FIG. 16 illustrates an example implementation 1600 of the process 600 of FIG. 6, in accordance with aspects of the disclosure. In particular, FIG. 16 depicts a diagram of a complex system which is designed to host a web application on a cloud environment. The system has many sub-systems (components) such as LoadBalancer (exposure), Cloud VPC Network (lateral movement), Cloud IAM (privilege escalation), Cloud Virtual Machine (Exploitation), Cloud DataStore (Exfiltration), Web App (vulnerability). In FIG. 16, a Tenable-centric implementation is depicted, whereby each different Tenable product is used for detecting isolated loopholes. In an aspect, each Tenable product sends their detection data into a centralized data lake (e.g., ASGARD) over which aspects of the disclosure are implemented so as to search interconnected attack paths.

In some designs, some or all of the above-noted aspects (e.g., chained query generation, attack path analysis, etc.) may be generated or enhanced via the use of machine learning (ML). For example, manual chaining of data source-specific queries may be used as training data to build an ML-based model which can then be used in conjunction with the DSL query generation at 610 of FIG. 6.

Machine learning may be used to generate models that may be used to facilitate various aspects associated with processing of data. One specific application of machine learning relates to generation of measurement models for processing of reference signals for positioning (e.g., positioning reference signal (PRS)), such as feature extraction, reporting of reference signal measurements (e.g., selecting which extracted features to report), and so on.

Machine learning models are generally categorized as either supervised or unsupervised. A supervised model may further be sub-categorized as either a regression or classification model. Supervised learning involves learning a function that maps an input to an output based on example input-output pairs. For example, given a training dataset with two variables of age (input) and height (output), a supervised learning model could be generated to predict the height of a person based on their age. In regression models, the output is continuous. One example of a regression model is a linear regression, which simply attempts to find a line that best fits the data. Extensions of linear regression include multiple linear regression (e.g., finding a plane of best fit) and polynomial regression (e.g., finding a curve of best fit).

Another example of a machine learning model is a decision tree model. In a decision tree model, a tree structure is defined with a plurality of nodes. Decisions are used to move from a root node at the top of the decision tree to a leaf node at the bottom of the decision tree (i.e., a node with no further child nodes). Generally, a higher number of nodes in the decision tree model is correlated with higher decision accuracy.

Another example of a machine learning model is a decision forest. Random forests are an ensemble learning technique that builds off of decision trees. Random forests involve creating multiple decision trees using bootstrapped datasets of the original data and randomly selecting a subset of variables at each step of the decision tree. The model then selects the mode of all of the predictions of each decision tree. By relying on a "majority wins" model, the risk of error from an individual tree is reduced.

Another example of a machine learning model is a neural network (NN). A neural network is essentially a network of mathematical equations. Neural networks accept one or more input variables, and by going through a network of equations, result in one or more output variables. Put another way, a neural network takes in a vector of inputs and returns a vector of outputs.

Figure 17:
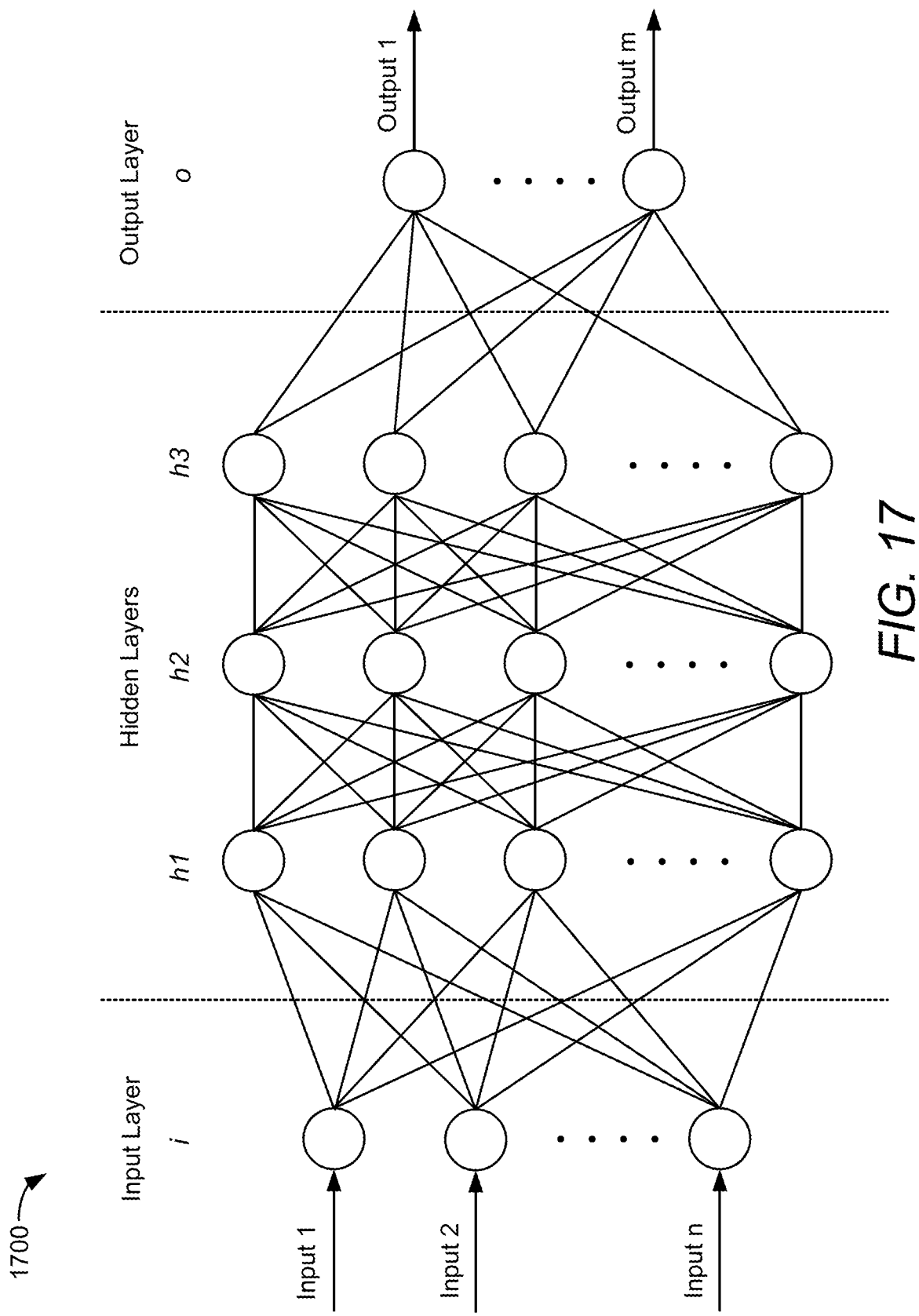
FIG. 17 illustrates an example neural network, according to aspects of the disclosure.

FIG. 17 illustrates an example neural network 1700, according to aspects of the disclosure. The neural network 1700 includes an input layer 'i' that receives 'n' (one or more) inputs (illustrated as "Input 1," "Input 2," and "Input n"), one or more hidden layers (illustrated as hidden layers 'h1,' 'h2,' and 'h3') for processing the inputs from the input layer, and an output layer 'o' that provides 'm' (one or more) outputs (labeled "Output 1" and "Output m"). The number of inputs 'n,' hidden layers 'h,' and outputs 'm' may be the same or different. In some designs, the hidden layers 'h' may include linear function(s) and/or activation function(s) that the nodes (illustrated as circles) of each successive hidden layer process from the nodes of the previous hidden layer.

In classification models, the output is discrete. One example of a classification model is logistic regression. Logistic regression is similar to linear regression but is used to model the probability of a finite number of outcomes, typically two. In essence, a logistic equation is created in such a way that the output values can only be between '0' and '1.' Another example of a classification model is a support vector machine. For example, for two classes of data, a support vector machine will find a hyperplane or a boundary between the two classes of data that maximizes the margin between the two classes. There are many planes that can separate the two classes, but only one plane can maximize the margin or distance between the classes. Another example of a classification model is Naïve Bayes, which is based on Bayes Theorem. Other examples of classification models include decision tree, random forest, and neural network, similar to the examples described above except that the output is discrete rather than continuous.

Unlike supervised learning, unsupervised learning is used to draw inferences and find patterns from input data without references to labeled outcomes. Two examples of unsupervised learning models include clustering and dimensionality reduction.

Clustering is an unsupervised technique that involves the grouping, or clustering, of data points. Clustering is frequently used for customer segmentation, fraud detection, and document classification. Common clustering techniques include k-means clustering, hierarchical clustering, mean shift clustering, and density-based clustering. Dimensionality reduction is the process of reducing the number of random variables under consideration by obtaining a set of principal variables. In simpler terms, dimensionality reduction is the process of reducing the dimension of a feature set (in even simpler terms, reducing the number of features). Most dimensionality reduction techniques can be categorized as either feature elimination or feature extraction. One example of dimensionality reduction is called principal component analysis (PCA). In the simplest sense, PCA involves project higher dimensional data (e.g., three dimensions) to a smaller space (e.g., two dimensions). This results in a lower dimension of data (e.g., two dimensions instead of three dimensions) while keeping all original variables in the model.

Regardless of which machine learning model is used, at a high-level, a machine learning module (e.g., implemented by a processing system) may be configured to iteratively analyze training input data (e.g., measurements of reference signals to/from various target UEs) and to associate this training input data with an output data set (e.g., a set of possible or likely candidate locations of the various target UEs), thereby enabling later determination of the same output data set when presented with similar input data (e.g., from other target UEs at the same or similar location).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating a component, comprising: generating a domain-specific language (DSL) query comprising an ordered set of data source-specific queries that comprises a set of chained data source-specific queries, wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query; executing the DSL query to derive a set of results comprising a DSL query result associated with the set of chained data source-specific queries, and a set of intermediate results associated with the set of chained data source-specific queries; and reporting information associated with the set of results.

Clause 2. The method of clause 1, wherein the DSL query is a DSL JavaScript Object Notation (JSON) query.

Clause 3. The method of any of clauses 1 to 2, wherein the first field of the second data source-specific query inputs the first intermediate result of the first data source-specific query as a primitive.

Clause 4. The method of any of clauses 1 to 3, wherein the first data source-specific query is associated with a first data source and the second data source-specific query is associated with a second data source that is different than the first data source.

Clause 5. The method of clause 4, wherein the first data source is a public cloud and the second data source is a region, or wherein the first data source is the region and the second data source is a virtual private cloud, or wherein the first data source is the virtual private cloud and the second data source is a private subnet, or wherein the first data source is the private subnet and the second data source is a target group of instances.

Clause 6. The method of any of clauses 4 to 5, wherein the set of chained data source-specific queries is chained from a public cloud to a target group of instances inside of a private subset associated with the public cloud.

Clause 7. The method of any of clauses 1 to 6, wherein the set of chained data source-specific queries comprises a third data source-specific query that is configured to be executed after the second data source-specific query, with the third source-specific query being chained to the second data source-specific query via a second field of the third data source-specific query that is linked to a second intermediate result of the second data source-specific query.

Clause 8. The method of any of clauses 1 to 7, wherein the set of chained data source-specific queries comprises a third data source-specific query that is configured to be executed before the second data source-specific query, with the second data source-specific query being chained to the third source-specific query via a second field of the second data source-specific query that is linked to a second intermediate result of the third data source-specific query.

Clause 9. The method of any of clauses 1 to 8, wherein the first intermediate result is paginated.

Clause 10. The method of any of clauses 1 to 9, wherein the DSL query result corresponds to a result of a final data source-specific query of the set of chained data source-specific queries, and wherein the set of intermediate results comprises each intermediate result associated with each of the set of chained data source-specific queries except for the final data source-specific query of the set of chained data source-specific queries.

Clause 11. The method of any of clauses 1 to 10, wherein the first intermediate result of the first data source-specific query is a pre-fetched query result.

Clause 12. The method of any of clauses 1 to 11, wherein the reporting reports the DSL query result, or wherein the reporting reports one or more intermediate results from the set of intermediate results, or a combination thereof.

Clause 13. The method of any of clauses 1 to 12, further comprising: transforming the set of results into a graph data set, wherein the reporting reports the graph data set.

Clause 14. The method of any of clauses 1 to 13, further comprising: scanning the set of results to detect an attack chain stage associated with an intrusion.

Clause 15. A component, comprising: one or more memories; and one or more processors communicatively coupled to the one or more memories, the one or more processors, either alone or in combination, configured to: generate a domain-specific language (DSL) query comprising an ordered set of data source-specific queries that comprises a set of chained data source-specific queries, wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query; execute the DSL query to derive a set of results comprising a DSL query result associated with the set of chained data source-specific queries, and a set of intermediate results associated with the set of chained data source-specific queries; and report information associated with the set of results.

Clause 16. The component of clause 15, wherein the DSL query is a DSL JavaScript Object Notation (JSON) query.

Clause 17. The component of any of clauses 15 to 16, wherein the first field of the second data source-specific query inputs the first intermediate result of the first data source-specific query as a primitive.

Clause 18. The component of any of clauses 15 to 17, wherein the first data source-specific query is associated with a first data source and the second data source-specific query is associated with a second data source that is different than the first data source.

Clause 19. The component of clause 18, wherein the first data source is a public cloud and the second data source is a region, or wherein the first data source is the region and the second data source is a virtual private cloud, or wherein the first data source is the virtual private cloud and the second data source is a private subnet, or wherein the first data source is the private subnet and the second data source is a target group of instances.

Clause 20. The component of any of clauses 18 to 19, wherein the set of chained data source-specific queries is chained from a public cloud to a target group of instances inside of a private subset associated with the public cloud.

Clause 21. The component of any of clauses 15 to 20, wherein the set of chained data source-specific queries comprises a third data source-specific query that is configured to be executed after the second data source-specific query, with the third source-specific query being chained to the second data source-specific query via a second field of the third data source-specific query that is linked to a second intermediate result of the second data source-specific query.

Clause 22. The component of any of clauses 15 to 21, wherein the set of chained data source-specific queries comprises a third data source-specific query that is configured to be executed before the second data source-specific query, with the second data source-specific query being chained to the third source-specific query via a second field of the second data source-specific query that is linked to a second intermediate result of the third data source-specific query.

Clause 23. The component of any of clauses 15 to 22, wherein the first intermediate result is paginated.

Clause 24. The component of any of clauses 15 to 23, wherein the DSL query result corresponds to a result of a final data source-specific query of the set of chained data source-specific queries, and wherein the set of intermediate results comprises each intermediate result associated with each of the set of chained data source-specific queries except for the final data source-specific query of the set of chained data source-specific queries.

Clause 25. The component of any of clauses 15 to 24, wherein the first intermediate result of the first data source-specific query is a pre-fetched query result.

Clause 26. The component of any of clauses 15 to 25, wherein the reporting reports the DSL query result, or wherein the reporting reports one or more intermediate results from the set of intermediate results, or a combination thereof.

Clause 27. The component of any of clauses 15 to 26, wherein the one or more processors, either alone or in combination, are further configured to: transform the set of results into a graph data set, wherein the reporting reports the graph data set.

Clause 28. The component of any of clauses 15 to 27, wherein the one or more processors, either alone or in combination, are further configured to: scan the set of results to detect an attack chain stage associated with an intrusion.

Clause 29. A non-transitory computer-readable medium storing computer-executable instructions that, when executed by a component, cause the component to: generate a domain-specific language (DSL) query comprising an ordered set of data source-specific queries that comprises a set of chained data source-specific queries, wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query; execute the DSL query to derive a set of results comprising a DSL query result associated with the set of chained data source-specific queries, and a set of intermediate results associated with the set of chained data source-specific queries; and report information associated with the set of results.

Clause 30. The non-transitory computer-readable medium of clause 29, wherein the DSL query is a DSL JavaScript Object Notation (JSON) query.

Clause 31. The non-transitory computer-readable medium of any of clauses 29 to 30, wherein the first field of the second data source-specific query inputs the first intermediate result of the first data source-specific query as a primitive.

Clause 32. The non-transitory computer-readable medium of any of clauses 29 to 31, wherein the first data source-specific query is associated with a first data source and the second data source-specific query is associated with a second data source that is different than the first data source.

Clause 33. The non-transitory computer-readable medium of clause 32, wherein the first data source is a public cloud and the second data source is a region, or wherein the first data source is the region and the second data source is a virtual private cloud, or wherein the first data source is the virtual private cloud and the second data source is a private subnet, or wherein the first data source is the private subnet and the second data source is a target group of instances.

Clause 34. The non-transitory computer-readable medium of any of clauses 32 to 33, wherein the set of chained data source-specific queries is chained from a public cloud to a target group of instances inside of a private subset associated with the public cloud.

Clause 35. The non-transitory computer-readable medium of any of clauses 29 to 34, wherein the set of chained data source-specific queries comprises a third data source-specific query that is configured to be executed after the second data source-specific query, with the third source-specific query being chained to the second data source-specific query via a second field of the third data source-specific query that is linked to a second intermediate result of the second data source-specific query.

Clause 36. The non-transitory computer-readable medium of any of clauses 29 to 35, wherein the set of chained data source-specific queries comprises a third data source-specific query that is configured to be executed before the second data source-specific query, with the second data source-specific query being chained to the third source-specific query via a second field of the second data source-specific query that is linked to a second intermediate result of the third data source-specific query.

Clause 37. The non-transitory computer-readable medium of any of clauses 29 to 36, wherein the first intermediate result is paginated.

Clause 38. The non-transitory computer-readable medium of any of clauses 29 to 37, wherein the DSL query result corresponds to a result of a final data source-specific query of the set of chained data source-specific queries, and wherein the set of intermediate results comprises each intermediate result associated with each of the set of chained data source-specific queries except for the final data source-specific query of the set of chained data source-specific queries.

Clause 39. The non-transitory computer-readable medium of any of clauses 29 to 38, wherein the first intermediate result of the first data source-specific query is a pre-fetched query result.

Clause 40. The non-transitory computer-readable medium of any of clauses 29 to 39, wherein the reporting reports the DSL query result, or wherein the reporting reports one or more intermediate results from the set of intermediate results, or a combination thereof.

Clause 41. The non-transitory computer-readable medium of any of clauses 29 to 40, further comprising computer-executable instructions that, when executed by the component, cause the component to: transform the set of results into a graph data set, wherein the reporting reports the graph data set.

Clause 42. The non-transitory computer-readable medium of any of clauses 29 to 41, further comprising computer-executable instructions that, when executed by the component, cause the component to: scan the set of results to detect an attack chain stage associated with an intrusion.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects and embodiments described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences, and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in an IoT device. In the alternative, the processor and the non-transitory computer-readable medium may be discrete components in a user terminal.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line, or wireless technologies such as infrared, radio, and microwave, then the coaxial cable, fiber optic cable, twisted pair, digital subscriber line, or wireless technologies such as infrared, radio, and microwave are included in the definition of a medium. The term disk and disc, which may be used interchangeably herein, includes CD, laser disc, optical disc, DVD, floppy disk, and Blu-ray discs, which usually reproduce data magnetically and/or optically with lasers. Combinations of the above should also be included within the scope of computer-readable media.

While the foregoing disclosure shows illustrative aspects and embodiments, those skilled in the art will appreciate that various changes and modifications could be made herein without departing from the scope of the disclosure as defined by the appended claims. Furthermore, in accordance with the various illustrative aspects and embodiments described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

What is claimed is:

1. A method of operating a component, comprising:
   generating a domain-specific language (DSL) query comprising an ordered set of data source-specific queries that comprises a set of chained data source-specific queries,
   wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query;
   executing the DSL query to derive a set of results comprising a DSL query result associated with the set of chained data source-specific queries, and a set of intermediate results associated with the set of chained data source-specific queries;
   reporting information associated with the set of results; and
   scanning the set of intermediate results to detect an attack chain stage associated with an intrusion,
   wherein the first data source-specific query is associated with a first data source and the second data source-specific query is associated with a second data source that is different than the first data source, and
   wherein the first data source is a region and the second data source is a virtual private cloud, or the first data source is the virtual private cloud and the second data source is a private subnet, or the first data source is the private subnet and the second data source is a target group of instances.

2. The method of claim 1, wherein the DSL query is a DSL JavaScript Object Notation (JSON) query.

3. The method of claim 1, wherein the first field of the second data source-specific query inputs the first intermediate result of the first data source-specific query as a primitive.

4. The method of claim 1, wherein the set of chained data source-specific queries is chained from a public cloud to the target group of instances.

5. The method of claim 1, wherein the set of chained data source-specific queries comprises a third data source-specific query that is configured to be executed after the second data source-specific query, with the third data source-specific query being chained to the second data source-specific query via a second field of the third data source-specific query that is linked to a second intermediate result of the second data source-specific query.

6. The method of claim 1, wherein the set of chained data source-specific queries comprises a third data source-specific query that is configured to be executed before the second data source-specific query, with the second data source-specific query being chained to the third data source-specific query via a second field of the second data source-specific query that is linked to a second intermediate result of the third data source-specific query.

7. The method of claim 1, wherein the first intermediate result is paginated.

8. The method of claim 1,
   wherein the DSL query result corresponds to a result of a final data source-specific query of the set of chained data source-specific queries, and
   wherein the set of intermediate results comprises each intermediate result associated with each of the set of chained data source-specific queries except for the final data source-specific query of the set of chained data source-specific queries.

9. The method of claim 1, wherein the first intermediate result of the first data source-specific query is a pre-fetched query result.

10. The method of claim 1,
    wherein the reporting reports the DSL query result, or
    wherein the reporting reports one or more intermediate results from the set of intermediate results, or
    a combination thereof.

11. The method of claim 1, further comprising:
    transforming the set of results into a graph data set,
    wherein the reporting reports the graph data set.

12. A component, comprising:
    one or more memories; and
    one or more processors communicatively coupled to the one or more memories, the one or more processors, either alone or in combination, configured to:
    generate a domain-specific language (DSL) query comprising an ordered set of data source-specific queries that comprises a set of chained data source-specific queries,
    wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query;

execute the DSL query to derive a set of results comprising a DSL query result associated with the set of chained data source-specific queries, and a set of intermediate results associated with the set of chained data source-specific queries;

report information associated with the set of results; and scan the set of results to detect an attack chain stage associated with an intrusion, wherein the first data source-specific query is associated with a first data source and the second data source-specific query is associated with a second data source that is different than the first data source, and wherein the first data source is a region and the second data source is a virtual private cloud, or the first data source is the virtual private cloud and the second data source is a private subnet, or the first data source is the private subnet and the second data source is a target group of instances.

13. The component of claim 12, wherein the DSL query is a DSL JavaScript Object Notation (JSON) query.

14. The component of claim 12, wherein the first field of the second data source-specific query inputs the first intermediate result of the first data source-specific query as a primitive.

15. The component of claim 12, wherein the set of chained data source-specific queries is chained from a public cloud to the target group of instances.

16. The component of claim 12, wherein the set of chained data source-specific queries comprises a third data source-specific query that is configured to be executed after the second data source-specific query, with the third data source-specific query being chained to the second data source-specific query via a second field of the third data source-specific query that is linked to a second intermediate result of the second data source-specific query.

17. The component of claim 12, wherein the set of chained data source-specific queries comprises a third data source-specific query that is configured to be executed before the second data source-specific query, with the second data source-specific query being chained to the third data source-specific query via a second field of the second data source-specific query that is linked to a second intermediate result of the third data source-specific query.

18. The component of claim 12, wherein the first intermediate result is paginated.

19. The component of claim 12,
wherein the DSL query result corresponds to a result of a final data source-specific query of the set of chained data source-specific queries, and
wherein the set of intermediate results comprises each intermediate result associated with each of the set of chained data source-specific queries except for the final data source-specific query of the set of chained data source-specific queries.

20. The component of claim 12, wherein the first intermediate result of the first data source-specific query is a pre-fetched query result.

21. The component of claim 12,
wherein the reporting reports the DSL query result, or
wherein the reporting reports one or more intermediate results from the set of intermediate results, or
a combination thereof.

22. The component of claim 12, wherein the one or more processors, either alone or in combination, are further configured to:
transform the set of results into a graph data set,
wherein the reporting reports the graph data set.

23. A non-transitory computer-readable medium storing computer-executable instructions that, when executed by a component, cause the component to:
generate a domain-specific language (DSL) query comprising an ordered set of data source-specific queries that comprises a set of chained data source-specific queries,
wherein the set of chained data source-specific queries comprises a first data source-specific query and a second data source-specific query that is configured to be executed after the first data source-specific query, with the second data source-specific query being chained to the first data source-specific query via a first field of the second data source-specific query that is linked to a first intermediate result of the first data source-specific query;

execute the DSL query to derive a set of results comprising a DSL query result associated with the set of chained data source-specific queries, and a set of intermediate results associated with the set of chained data source-specific queries;

report information associated with the set of results; and scan the set of results to detect an attack chain stage associated with an intrusion, wherein the first data source-specific query is associated with a first data source and the second data source-specific query is associated with a second data source that is different than the first data source, and wherein the first data source is a region and the second data source is a virtual private cloud, or the first data source is the virtual private cloud and the second data source is a private subnet, or the first data source is the private subnet and the second data source is a target group of instances.

24. The non-transitory computer-readable medium of claim 23, wherein the DSL query is a DSL JavaScript Object Notation (JSON) query.

25. The non-transitory computer-readable medium of claim 23, wherein the first field of the second data source-specific query inputs the first intermediate result of the first data source-specific query as a primitive.

26. The non-transitory computer-readable medium of claim 23, wherein the set of chained data source-specific queries is chained from a public cloud to the target group of instances.

27. The non-transitory computer-readable medium of claim 23, wherein the set of chained data source-specific queries comprises a third data source-specific query that is configured to be executed after the second data source-specific query, with the third data source-specific query being chained to the second data source-specific query via a second field of the third data source-specific query that is linked to a second intermediate result of the second data source-specific query.

28. The non-transitory computer-readable medium of claim 23, wherein the set of chained data source-specific queries comprises a third data source-specific query that is configured to be executed before the second data source-specific query, with the second data source-specific query being chained to the third data source-specific query via a second field of the second data source-specific query that is linked to a second intermediate result of the third data source-specific query.

29. The non-transitory computer-readable medium of claim 23, wherein the first intermediate result is paginated.

30. The non-transitory computer-readable medium of claim 23,
   wherein the DSL query result corresponds to a result of a final data source-specific query of the set of chained data source-specific queries, and
   wherein the set of intermediate results comprises each intermediate result associated with each of the set of chained data source-specific queries except for the final data source-specific query of the set of chained data source-specific queries.

31. The non-transitory computer-readable medium of claim 23, wherein the first intermediate result of the first data source-specific query is a pre-fetched query result.

32. The non-transitory computer-readable medium of claim 23,
   wherein the reporting reports the DSL query result, or
   wherein the reporting reports one or more intermediate results from the set of intermediate results, or
   a combination thereof.

33. The non-transitory computer-readable medium of claim 23, further comprising computer-executable instructions that, when executed by the component, cause the component to:
   transform the set of results into a graph data set,
   wherein the reporting reports the graph data set.

* * * * *